(12) United States Patent
Myung et al.

(10) Patent No.: US 12,538,353 B2
(45) Date of Patent: Jan. 27, 2026

(54) METHOD FOR PERFORMING CHANNEL ACCESS PROCEDURE AND APPARATUS THEREFOR

(71) Applicant: LG ELECTRONICS INC., Seoul (KR)

(72) Inventors: Sechang Myung, Seoul (KR); Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 530 days.

(21) Appl. No.: 17/907,460

(22) PCT Filed: Apr. 6, 2021

(86) PCT No.: PCT/KR2021/004240
§ 371 (c)(1),
(2) Date: Sep. 27, 2022

(87) PCT Pub. No.: WO2021/206400
PCT Pub. Date: Oct. 14, 2021

(65) Prior Publication Data
US 2023/0319874 A1  Oct. 5, 2023

(30) Foreign Application Priority Data

Apr. 8, 2020 (KR) .......................... 10-2020-0042739
Oct. 15, 2020 (KR) .......................... 10-2020-0133381

(51) Int. Cl.
*H04W 74/0808* (2024.01)
*H04W 52/36* (2009.01)
*H04W 72/0457* (2023.01)

(52) U.S. Cl.
CPC ..... *H04W 74/0808* (2013.01); *H04W 52/367* (2013.01); *H04W 72/0457* (2023.01)

(58) Field of Classification Search
CPC .......... H04W 74/0808; H04W 52/367; H04W 72/0457; H04W 16/14; H04L 5/00
See application file for complete search history.

(56) References Cited

U.S. PATENT DOCUMENTS

2018/0352537 A1* 12/2018 Zhang .................. H04W 72/04
2018/0367282 A1* 12/2018 Li ..................... H04W 72/1268
(Continued)

FOREIGN PATENT DOCUMENTS

KR   10-2019-0138800    12/2019
WO      2019-014498      1/2019

OTHER PUBLICATIONS

PCT International Application No. PCT/KR2021/004240, International Search Report dated Jul. 21, 2021, 3 pages.
(Continued)

*Primary Examiner* — Chae S Lee
(74) *Attorney, Agent, or Firm* — LEE, HONG, DEGERMAN, KANG & WAIMEY

(57) ABSTRACT

Disclosed is a method for transmitting a signal by an apparatus in a wireless communication system. In particular, the method may be characterized by: performing a first listen before talk (LBT) for the entire second bandwidth including a plurality of first bandwidths; on the basis of the first LBT having succeeded, transmitting the signal via the second bandwidth; on the basis of the first LBT having failed, performing a second LBT for at least one first bandwidth that is some of the plurality of first bandwidths; and on the basis of the second LBT having succeeded, transmitting the signal via the at least one first bandwidth.

15 Claims, 17 Drawing Sheets

(56) References Cited

U.S. PATENT DOCUMENTS

| | | | |
|---|---|---|---|
| 2020/0107322 A1 | 4/2020 | Lunttila et al. | |
| 2021/0185730 A1* | 6/2021 | Xue | H04W 74/0816 |
| 2021/0235495 A1* | 7/2021 | Xu | H04W 74/0808 |
| 2023/0345440 A1* | 10/2023 | Cui | H04W 16/14 |
| 2024/0188126 A1* | 6/2024 | Babaei | H04W 74/0808 |
| 2024/0224334 A1* | 7/2024 | Noh | H04L 27/2657 |

OTHER PUBLICATIONS

LG Electronics, "Channel access procedure for NR-U," R1-1912389, 3GPP TSG RAN WG1 Meeting #99, Nov. 2019, 21 pages.
NEC, "Remaining issues on CP extension," R1-2000767, 3GPP TSG RAN WG1 #100-e, Mar. 2020, 9 pages.

* cited by examiner (a) Uplink Tx procedure based on dynamic grant (b) Uplink Tx procedure based on configured grant (a) Carrier aggregation between L-band and U-band (b) Standalone U-band(s)

METHOD FOR PERFORMING CHANNEL ACCESS PROCEDURE AND APPARATUS THEREFOR

CROSS-REFERENCE TO RELATED APPLICATION(S)

This application is the National Stage filing under 35 U.S.C. 371 of International Application No. PCT/KR2021/004240, filed on Apr. 6, 2021, which claims the benefit of earlier filing date and right of priority to Korean Application Nos. 10-2020-0042739, filed on Apr. 8, 2020, and 10-2020-0133381, filed on Oct. 15, 2020, the contents of which are all hereby incorporated by reference herein in their entireties.

TECHNICAL FIELD

The present disclosure relates to a method and apparatus for performing a channel access procedure, and more particularly to a method and apparatus for performing a channel access procedure for transmitting and receiving uplink and downlink signals in an unlicensed high frequency band of 52.6 GHz or higher.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An object of the present disclosure is to provide a method of performing a channel access procedure and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with an aspect of the present disclosure, a method for transmitting a signal by a device in a wireless communication system may include performing a first listen before talk (LBT) for the entire second bandwidth including a plurality of first bandwidths; transmitting the signal through the second bandwidth, based on success of the first LBT; performing a second LBT for at least one first bandwidth corresponding to a portion of the plurality of first bandwidths, based on failure of the first LBT; and transmitting the signal through the at least one first bandwidth, based on success of the second LBT.

The at least one first bandwidth may be instructed through semi-static signaling or dynamic signaling transferred from another device to the device.

A maximum output power value for transmitting the signal through the at least one first bandwidth may be configured based on a size of the at least one first bandwidth, and an energy detection (ED) threshold for the second LBT is configured based on the maximum output power value.

An energy detection (ED) threshold for the second LBT may be configured based on a size of the at least one first bandwidth; and a maximum output power value for transmitting the signal through the at least one first bandwidth may be fixed.

A maximum output power value for transmitting the signal through the at least one first bandwidth and an energy detection (ED) threshold for the second LBT may be fixed regardless of a size of the at least one first bandwidth.

A maximum output power value for transmitting the signal through the second bandwidth and an energy detection (ED) threshold for the first LBT may be fixed values corresponding to the second bandwidth.

The number of orthogonal frequency division multiplexing (OFDM) symbols for a cyclic prefix extension (CPE) used for at least one of the first LBT and the second LBT may be determined based on a subcarrier spacing (SCS) and information indicating whether a super cyclic prefix (SCP) contained in a duration for the CPE is included.

In accordance with another aspect of the present disclosure, a device for transmitting a signal in a wireless communication system may include at least one processor; and at least one memory operatively connected to the at least one processor, and configured to store instructions such that the at least one processor performs specific operations by executing the instructions. The specific operations may include: performing a first listen before talk (LBT) for the entire second bandwidth including a plurality of first bandwidths; transmitting the signal through the second bandwidth, based on success of the first LBT; performing a second LBT for at least one first bandwidth corresponding to a portion of the plurality of first bandwidths, based on failure of the first LBT; and transmitting the signal through the at least one first bandwidth, based on success of the second LBT.

The at least one first bandwidth may be instructed through semi-static signaling or dynamic signaling transferred from another device to the device.

A maximum output power value for transmitting the signal through the at least one first bandwidth may be configured based on a size of the at least one first bandwidth, and an energy detection (ED) threshold for the second LBT may be configured based on the maximum output power value.

An energy detection (ED) threshold for the second LBT may be configured based on a size of the at least one first bandwidth, and a maximum output power value for transmitting the signal through the at least one first bandwidth may be fixed.

A maximum output power value for transmitting the signal through the at least one first bandwidth and an energy detection (ED) threshold for the second LBT may be fixed regardless of a size of the at least one first bandwidth.

A maximum output power value for transmitting the signal through the second bandwidth and an energy detection (ED) threshold for the first LBT may be fixed values corresponding to the second bandwidth.

The number of orthogonal frequency division multiplexing (OFDM) symbols for a cyclic prefix extension (CPE) used for at least one of the first LBT and the second LBT may be determined based on a subcarrier spacing (SCS) and information indicating whether a super cyclic prefix (SCP) contained in a duration for the CPE is included.

In accordance with another aspect of the present disclosure, a computer-readable storage medium configured to store at least one computer program for allowing at least one processor to perform operations may include performing the operations. The operations may include: performing a first listen before talk (LBT) for the entire second bandwidth including a plurality of first bandwidths; transmitting the signal through the second bandwidth, based on success of the first LBT; performing a second LBT for at least one first bandwidth corresponding to a portion of the plurality of first bandwidths, based on failure of the first LBT; and transmitting the signal through the at least one first bandwidth, based on success of the second LBT.

Advantageous Effects

As is apparent from the above description, the method and apparatus for performing a channel access procedure according to the embodiments of the present disclosure may configure parameters, bandwidths, etc. to be used in the channel access procedure in consideration of other communication systems coexisting with the NR system in a 52.6 GHz band, thereby efficiently performing the channel access procedure while coexisting with other systems.

It will be appreciated by persons skilled in the art that the effects that could be achieved with the present disclosure are not limited to what has been particularly described hereinabove and other advantages of the present disclosure will be more clearly understood from the following detailed description.

BEST MODE

Figure 1:
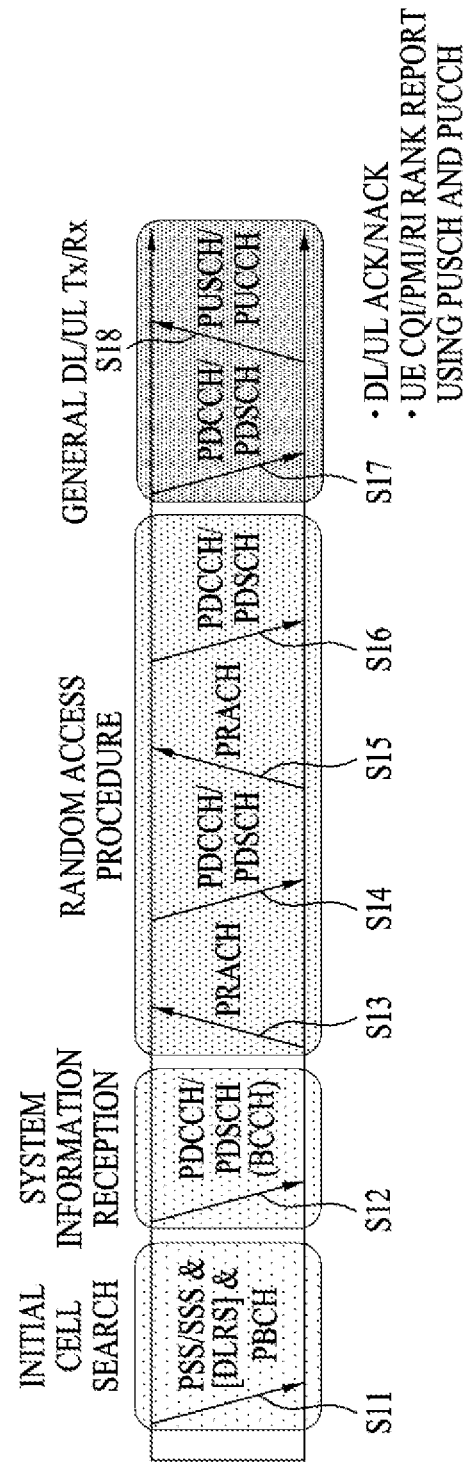
FIG. 1 illustrates physical channels and a general signal transmission method using the physical channels in a 3rd generation partnership project (3GPP) system as an exemplary wireless communication system.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
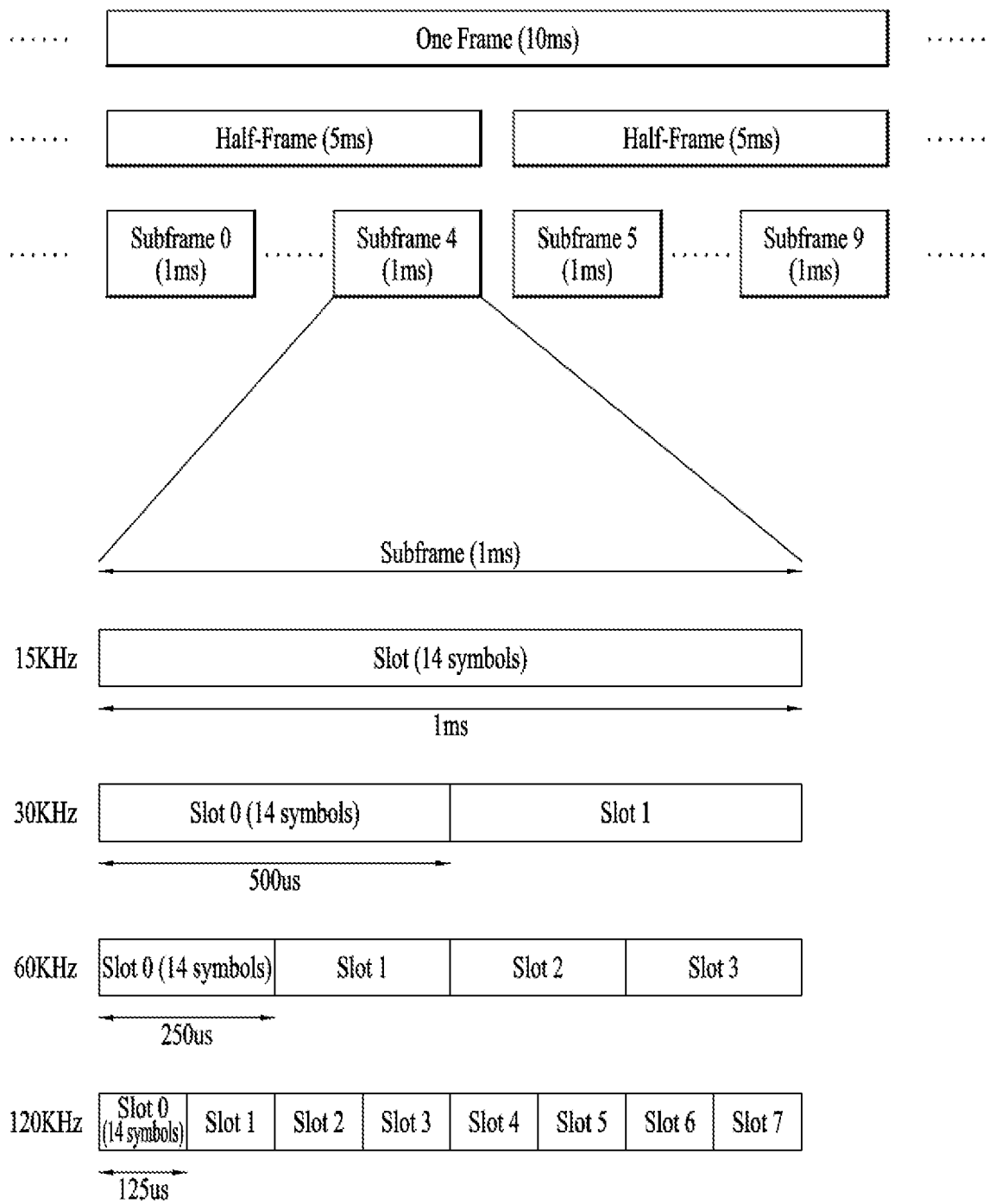
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot,
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
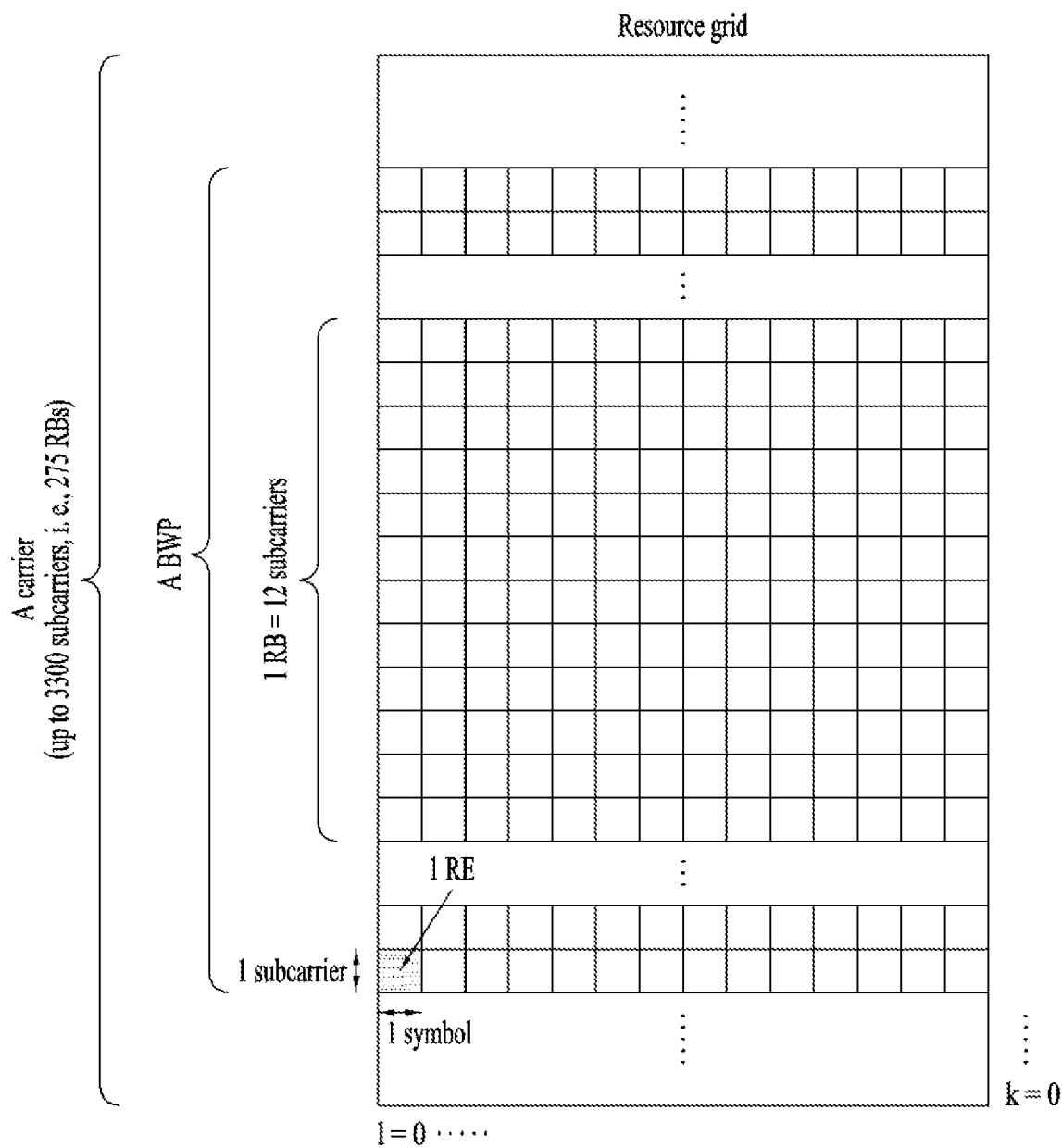
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
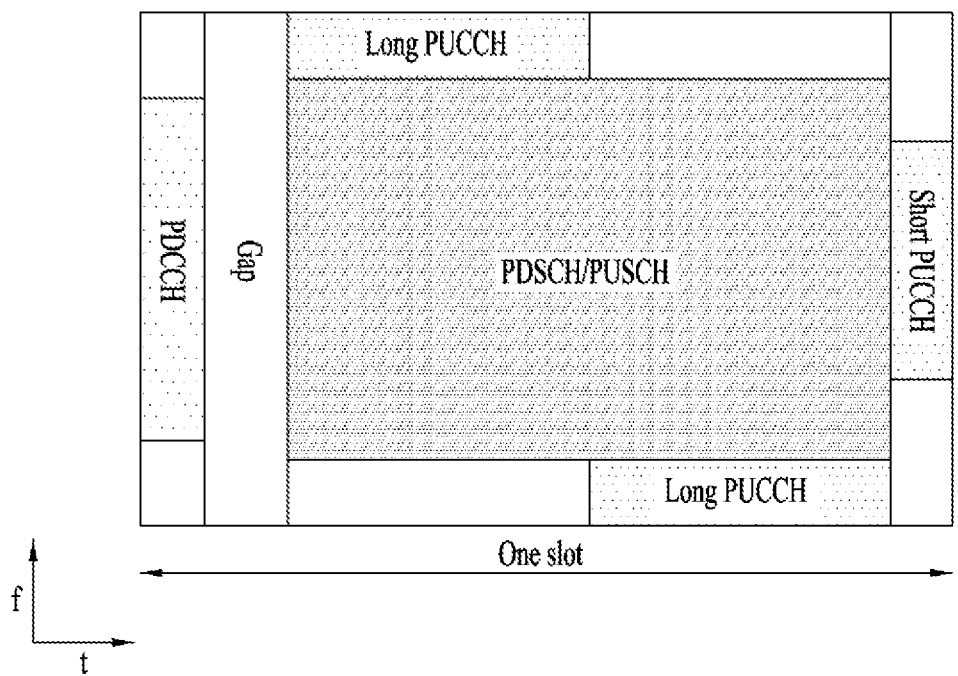
FIG. 4 illustrates exemplary mapping of physical channels in a slot.

FIG. 4 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

Now, a detailed description will be given of physical channels.

DL Channel Structures

An eNB transmits related signals on later-described DL channels to a UE, and the UE receives the related signals on the DL channels from the eNB.

(1) Physical Downlink Shared Channel (PDSCH)

The PDSCH carries DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). For example, the following parameters/information may be used to configure a CORESET, and a plurality of CORESETs may overlap with each other in the time/frequency domain.

controlResourceSetId: indicates the ID of a CORESET.

frequencyDomainResources: indicates the frequency area resources of the CORESET. The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.

precoderGranularity: indicates a precoder granularity in the frequency domain.

tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.

tci-PresentInDCI: indicates whether a TCI field is included in DCI.

pdcch-DMRS-ScramblingID: provides information used for initialization of a PDCCH DMRS scrambling sequence.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 4 lists exemplary PDCCH SSs.

TABLE 4

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |

TABLE 4-continued

| Type | Search Space | RNTI | Use Case |
|---|---|---|---|
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets.—searchSpaceId: indicates the ID of the SS set.

controlResourceSetId: indicates a CORESET associated with the SS set.
  monitoringSlotPeriodicityAndOffset: indicates a PDCCH monitoring periodicity (in slots) and a PDCCH monitoring offset (in slots).
  monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.
  nrofCandidates: indicates the number of PDCCH candidates (e.g., one of 0, 1, 2, 3, 4, 5, 6, and 8) for each AL={1, 2, 4, 8, 16}.
  searchSpaceType: indicates whether the SS type is CSS or USS.
  DCI format: indicates the DCI format of PDCCH candidates.

The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 5 illustrates exemplary DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 5-continued

| DCI format | Usage |
|---|---|
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs. DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

UL Channel Structures

A UE transmits a related signal to the BS on a UL channel, which will be described later, and the BS receives the related signal from the UE through the UL channel to be described later.

(1) Physical Uplink Control Channel (PUCCH)

The PUCCH carries UCI, HARQ-ACK and/or scheduling request (SR), and is divided into a short PUCCH and a long PUCCH according to the PUCCH transmission length.

The UCI includes the following information.
  SR: information used to request UL-SCH resources.
  HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.
  CSI: feedback information for a DL channel. Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration. PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

(2) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 2_1). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).

Type 2: the periodicity of a UL grant is configured by higher-layer signaling, and activation/deactivation of the CG is signaled by a PDCCH, to provide the UL grant.

Figure 5:
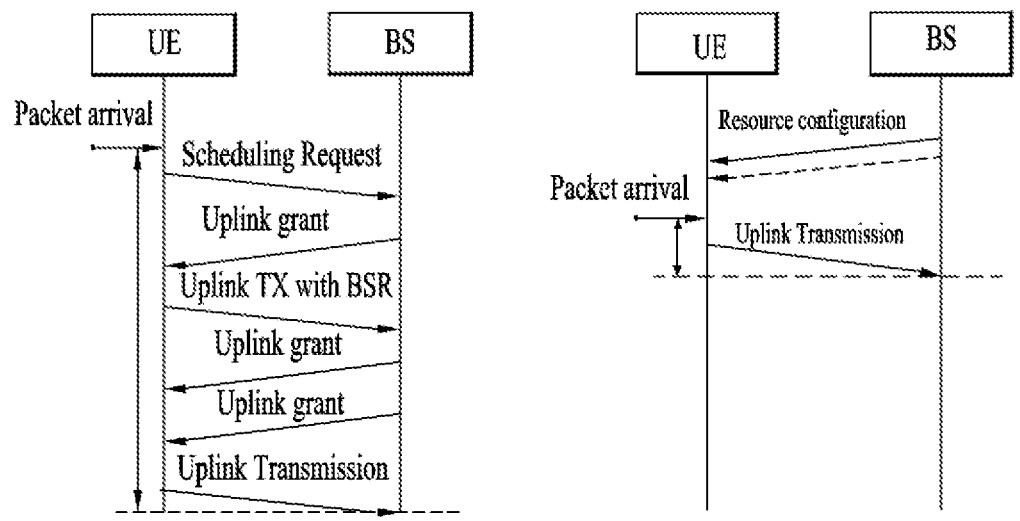
FIG. 5 illustrates exemplary uplink (UL) transmission operations of a user equipment (UE).

FIG. 5 illustrates exemplary UL transmission operations of a UE. The UE may transmit an intended packet based on a DG (FIG. 5(a)) or based on a CG (FIG. 5(b)).

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

Figure 6:
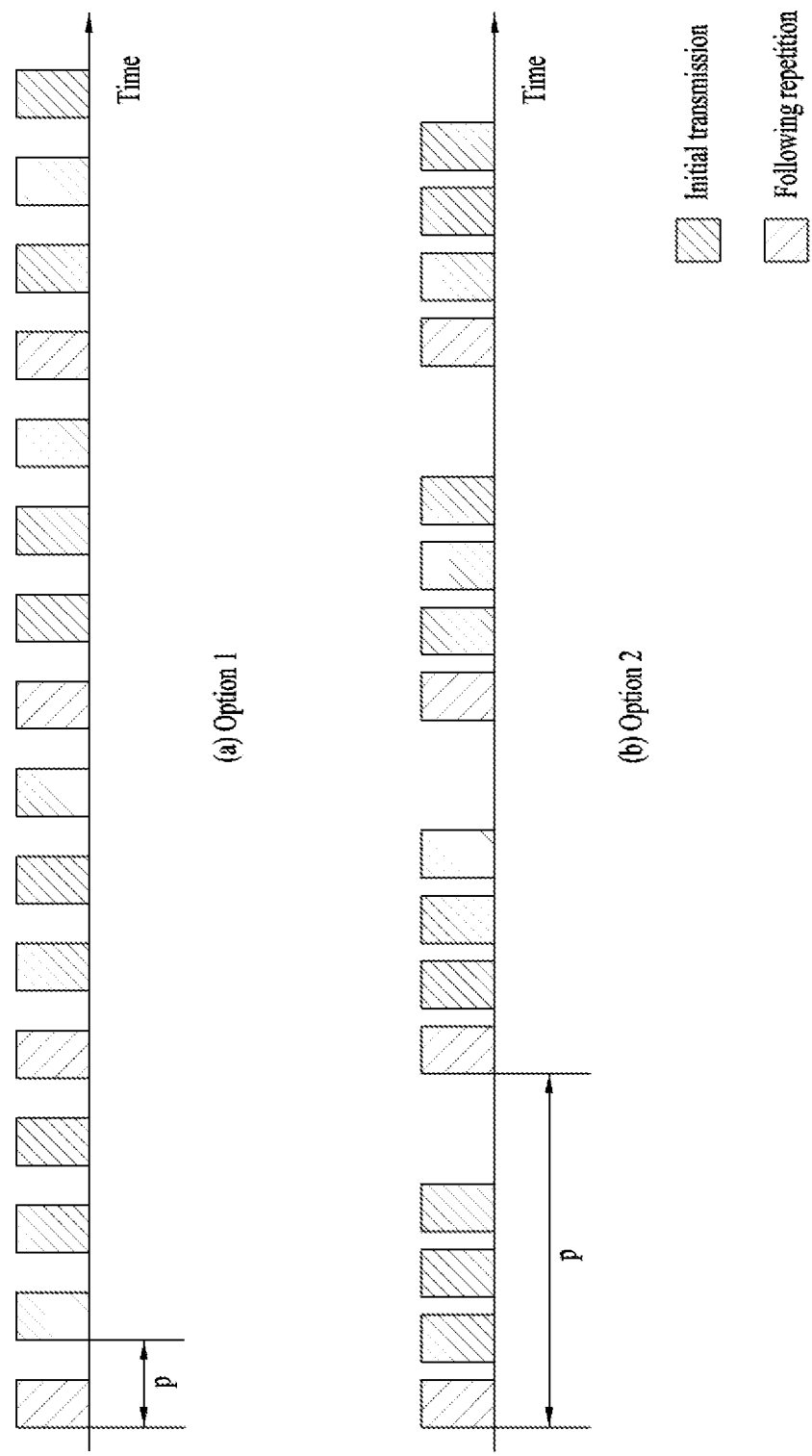
FIG. 6 illustrates exemplary repeated transmissions based on a configured grant.

FIG. 6 illustrates exemplary repeated transmissions based on a CG.

The UE performs repeated transmissions until one of the following conditions is satisfied:

A UL grant for the same TB is successfully received;

The repetition number of the TB reaches K; and (In Option 2) the ending time of a period P is reached.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

On LAA UL, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n−3)-th subframe has been configured as a reference subframe, and the CW size has been adjusted based on a new data indicator (NDI) for a HARQ process ID corresponding to the reference subframe. That is, when the BS toggles NDIs per one or more transport blocks (TBs) or instructs that one or more TBs be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

The BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

Figure 7:
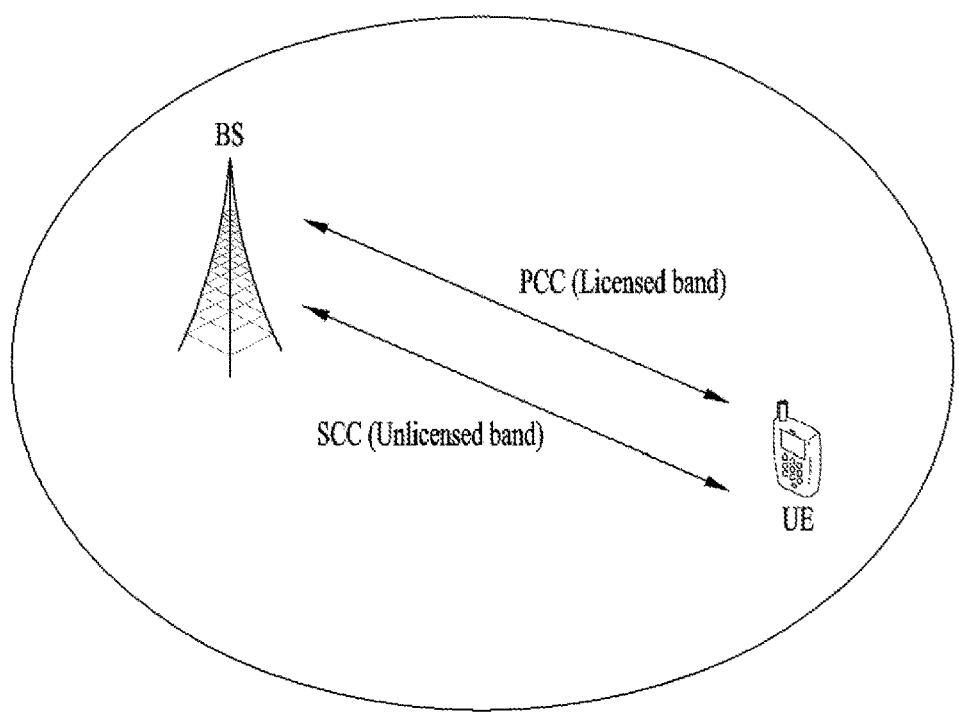
FIG. 7 illustrates a wireless communication system supporting an unlicensed band.
Figure 7:
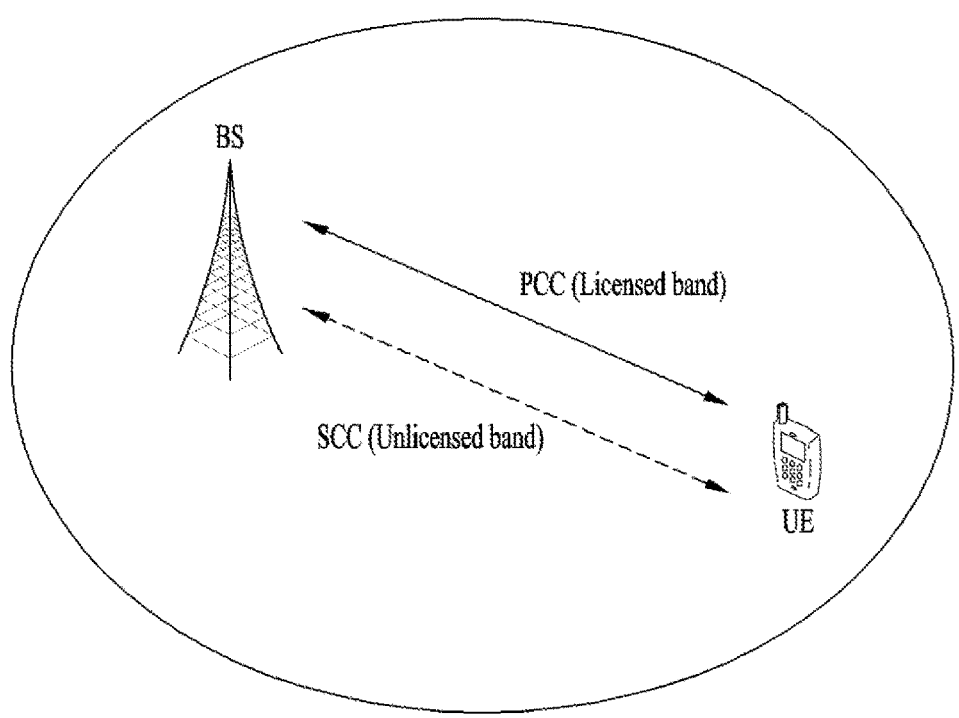

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 7(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 7(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of Tsl=9 us. The BS or the UE senses the slot during a sensing slot duration. When power detected for at least 4 us within the sensing slot duration is less than an energy detection threshold Xthresh, the sensing slot duration Tsl is be considered to be idle. Otherwise, the sensing slot duration Tsl is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 8:
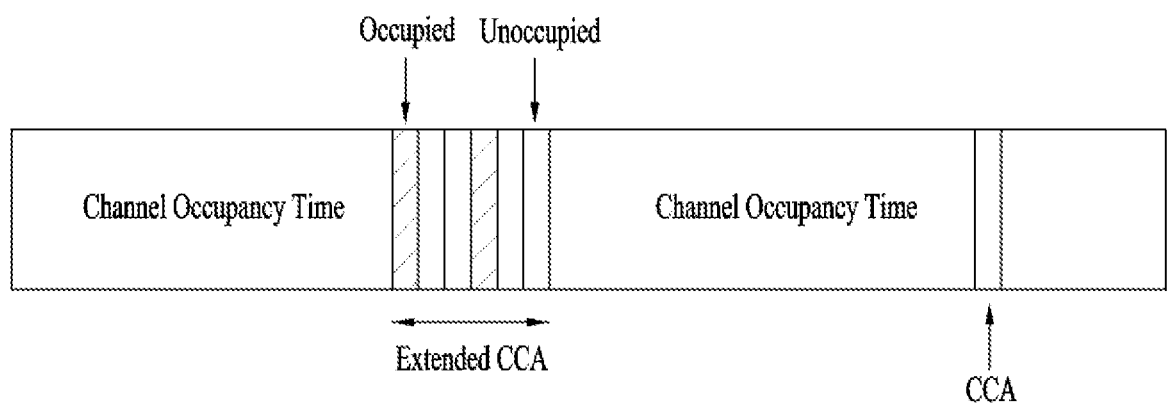
FIG. 8 illustrates an exemplary method of occupying resources in an unlicensed band.

FIG. 8 illustrates an exemplary method of occupying resources in an unlicensed band.

Referring to FIG. 8, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 7 describes an exemplary CAP supported in NR-U.

TABLE 7

| | Type | Explanation |
|---|---|---|
| DL | Type 1 CAP | CAP with random backoff |
| | | time duration spanned by the sensing slots that are sensed to be idle before a downlink transmission(s) is random |
| | Type 2 CAP | CAP without random backoff |
| | Type 2A, 2B, 2C | time duration spanned by sensing slots that are sensed to be idle before a downlink transmission(s) is deterministic |

TABLE 7-continued

| | Type | Explanation |
|---|---|---|
| UL | Type 1 CAP | CAP with random backoff |
| | | time duration spanned by the sensing slots that are sensed to be idle before a downlink transmission(s) is random |
| | Type 2 CAP | CAP without random backoff |
| | Type 2A, 2B, 2C | time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information. A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q\in\{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N\in\{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

An eNB/gNB or UE of an LTE/NR system should also perform LBT for signal transmission in an unlicensed band (referred to as a U-band for convenience). When the eNB or UE of the LTE/NR system transmits a signal, other communication nodes such as a Wi-Fi node should also perform LBT so as not to cause interference with transmission by the eNB or the UE. For example, in the Wi-Fi standard (801.11ac), a CCA threshold is defined as −62 dBm for a non-Wi-Fi signal and −82 dBm for a Wi-Fi signal. For example, when the non-Wi-Fi signal is received by a station (STA) or an access point (AP) with a power of more than −62 dBm, the STA or AP does not transmit other signals in order not to cause interference.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 9:
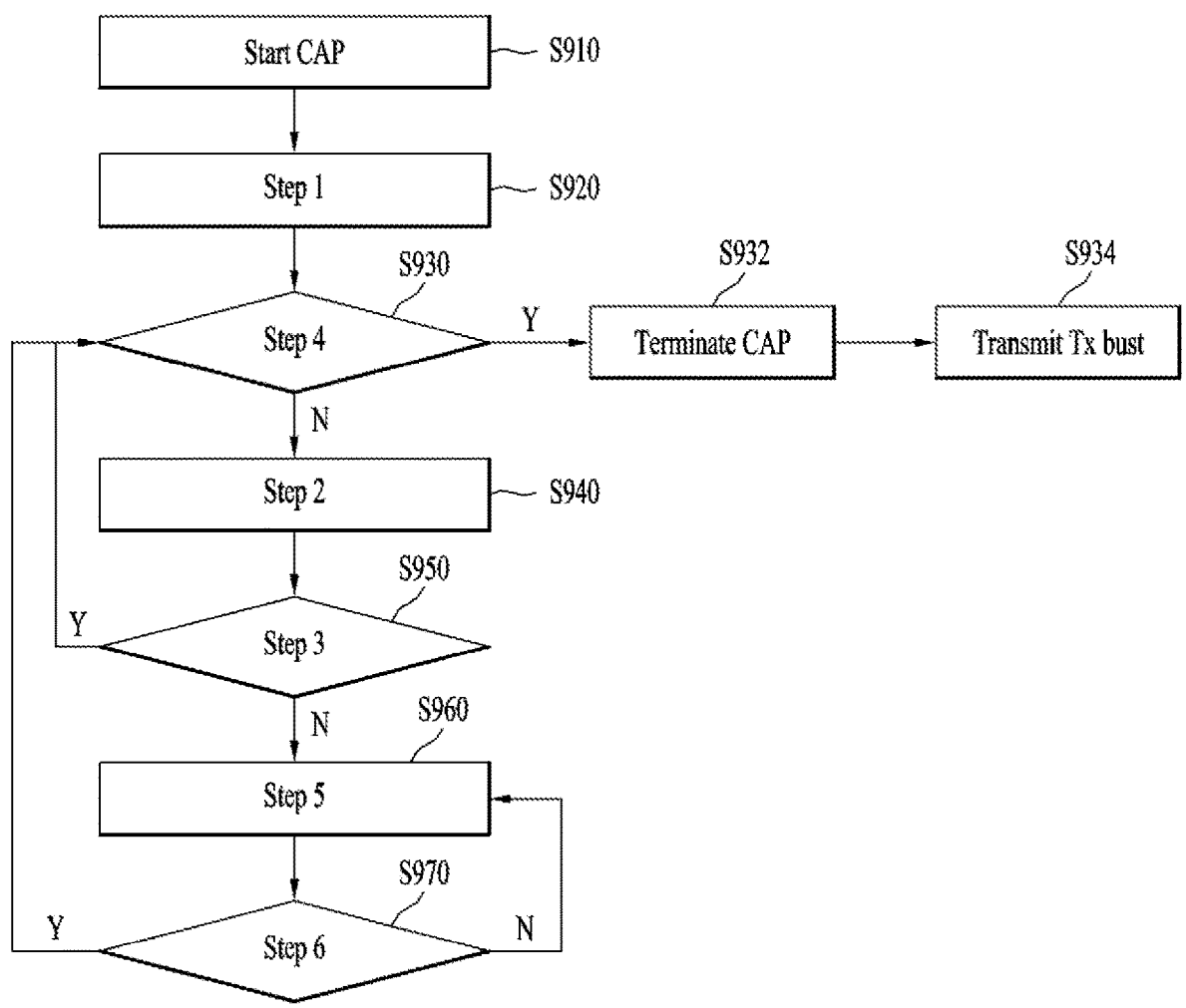
FIG. 9 illustrates an exemplary channel access procedure of a UE for UL signal transmission and/or DL signal transmission in an unlicensed band applicable to the present disclosure.

FIG. 9 illustrates Type 1 CAP among channel access procedures of a UE for UL/DL signal transmission in a U-band applicable to the present disclosure.

First, UL signal transmission in the U-band will be described with reference to FIG. 9.

The UE may sense whether a channel is idle for a sensing slot duration in a defer duration Td. After a counter N is decremented to 0, the UE may perform a transmission (S934). The counter N is adjusted by sensing the channel for additional slot duration(s) according to the following procedure.

Step 1) Set N=Ninit where Ninit is a random number uniformly distributed between 0 and CWp, and go to step 4 (S920).

Step 2) If N>0 and the UE chooses to decrement the counter, set N=N−1 (S940).

Step 3) Sense the channel for an additional slot duration, and if the additional slot duration is idle (Y), go to step 4. Else (N), go to step 5 (S950).

Step 4) If N=0 (Y) (S930), stop CAP (S932). Else (N), go to step 2.

Step 5) Sense the channel until a busy sensing slot is detected within the additional defer duration Td or all slots of the additional defer duration Td are sensed as idle (S960).

Step 6) If the channel is sensed as idle for all slot durations of the additional defer duration Td (Y), go to step 4. Else (N), go to step 5 (S970).

Table 8 illustrates that mp, a minimum CW, a maximum CW, a maximum channel occupancy time (MCOT), and an allowed CW size applied to a CAP vary according to channel access priority classes.

CWWmin,p<=CWp<=CWmax,p. CWp is set to CWmin,p, and may be updated before Step 1 based on an explicit/implicit reception response to a previous UL burst (e.g., PUSCH) (CW size update). For example, CWp may be initialized to CWmin,p based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration Tshort_dl (=25 us). Tshort_dl includes a duration Tf (=16 us) and one immediately following sensing slot duration. In the Type 2A UL CAP, Tf includes a sensing slot at the start of the duration. In the Type 2B UL CAP, the UE may transmit a signal immediately after the channel is sensed as idle during a sensing slot duration Tf (=16 us). In the Type 2B UL CAP, Tf includes a sensing slot within the last 9 us of the duration. In the Type 2C UL CAP, the UE does not sense a channel before a transmission.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as

TABLE 8

| Channel Access Priority Class (p) | mp | CWmin, p | CWmax, p | Tulmcot, p | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration Td includes a duration Tf (16 us) immediately followed by mp consecutive slot durations where each slot duration Tsl is 9 us, and Tf includes a sensing slot duration Tsl at the start of the 16-us duration.

RRC signaling and indicating information about the remaining resources (e.g., the offset of an initial transmission timing, time/frequency resource allocation, a DMRS parameter, and an MCS/TBS) by activation DCI as L1 signaling.

The biggest difference between autonomous uplink (AUL) of LTE LAA and a CG of NR is a HARQ-ACK feedback transmission method for a PUSCH that the UE has transmitted without receiving a UL grant and the presence or absence of UCI transmitted along with the PUSCH. While a HARQ process is determined by an equation of a symbol index, a symbol periodicity, and the number of HARQ processes in the CG of NR, explicit HARQ-ACK feedback information is transmitted in AUL downlink feedback information (AUL-DFI) in LTE LAA. Further, in LTE LAA, UCI including information such as a HARQ ID, an NDI, and an RV is also transmitted in AUL UCI whenever AUL PUSCH transmission is performed. In the case of the CG of NR, the BS identifies the UE by time/frequency resources and DMRS resources used for PUSCH transmission, whereas in the case of LTE LAA, the BS identifies the UE by a UE ID explicitly included in the AUL UCI transmitted together with the PUSCH as well as the DMRS resources.

Now, DL signal transmission in the U-band will be described with reference to FIG. 9.

The BS may perform one of the following U-band access procedures (e.g., channel access procedures (CAPs)) to transmit a DL signal in the U-band.

(1) Type 1 DL CAP Method

In a Type 1 DL CAP, the length of a time duration spanned by sensing slots that are sensed to be idle before transmission(s) is random. The Type 1 DL CAP may be applied to the following transmissions:

transmission(s) initiated by the BS, including (i) a unicast PDSCH with user plane data, or (ii) a unicast PDSCH with user plane data and a unicast PDCCH scheduling the user plane data; or transmission(s) initiated by the BS, including (i) only a discovery burst, or (ii) a discovery burst multiplexed with non-unicast information.

Referring to FIG. 9, the BS may first sense whether a channel is idle for a sensing slot duration of a defer duration Td. Next, if a counter N is decremented to 0, transmission may be performed (S934). The counter N is adjusted by sensing the channel for additional slot duration(s) according to the following procedures.

Step 1) Set N=Ninit where Ninit is a random number uniformly distributed between 0 and CWp, and go to step 4 (S920).

Step 2) If N>0 and the BS chooses to decrement the counter, set N=N−1 (S940).

Step 3) Sense the channel for an additional slot duration, and if the additional slot duration is idle (Y), go to step 4. Else (N), go to step 5 (S950).

Step 4) If N=0 (Y), stop a CAP (S1232 (?S932)). Else (N), go to step 2 (S930).

Step 5) Sense the channel until a busy sensing slot is detected within the additional defer duration Td or all slots of the additional defer duration Td are sensed to be idle (S960).

Step 6) If the channel is sensed to be idle for all slot durations of the additional defer duration Td (Y), go to step 4. Else (N), go to step 5 (S970).

Table 9 illustrates that mp, a minimum CW, a maximum CW, an MCOT, and an allowed CW size, which are applied to a CAP, vary according to channel access priority classes.

TABLE 9

| Channel Access Priority Class (p) | $m_p$ | CWmin, p | CWmax, p | Tmcot, p | allowed CWp sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration Td includes a duration Tf (16 μs) immediately followed by mp consecutive sensing slot durations where each sensing slot duration Tsl is 9 μs, and Tf includes the sensing slot duration Tsl at the start of the 16 μs duration.

$CWmin,p <= CWp <= CWmax,p$. CWp is set to CWmin,p, and may be updated (CW size update) before Step 1 based on HARQ-ACK feedback (e.g., ratio of ACK signals or NACK signals) for a previous DL burst (e.g., PDSCH). For example, CWp may be initialized to CWmin,p based on HARQ-ACK feedback for the previous DL burst, may be increased to the next highest allowed value, or may be maintained at an existing value.

(2) Type 2 DL CAP Method

In a Type 2 DL CAP, the length of a time duration spanned by sensing slots sensed to be idle before transmission(s) is deterministic. Type 2 DL CAPs are classified into Type 2A DL CAP, Type 2B DL CAP, and Type 2C DL CAP.

The Type 2A DL CAP may be applied to the following transmissions. In the Type 2A DL CAP, the BS may transmit a signal immediately after a channel is sensed to be idle during at least a sensing duration Tshort_dl=25 μs. Tshort_dl includes a duration Tf (=16 μs) and one immediately following sensing slot duration. Tf includes the sensing slot at the start of the duration.

- Transmission(s) initiated by the BS, including (i) only a discovery burst, or (ii) a discovery burst multiplexed with non-unicast information, or
- Transmission(s) of the BS after a gap of 25 μs from transmission(s) by the UE within shared channel occupancy.

The Type 2B DL CAP is applicable to transmission(s) performed by the BS after a gap of 16 μs from transmission(s) by the UE within shared channel occupancy. In the Type 2B DL CAP, the BS may transmit a signal immediately after a channel is sensed to be idle during Tf=16 μs. Tf includes a sensing slot within the last 9 μs of the duration. The Type 2C DL CAP is applicable to transmission(s) performed by the BS after a maximum of a gap of 16 μs from transmission(s) by the UE within shared channel occupancy. In the Type 2C DL CAP, the BS does not sense a channel before performing transmission.

Before a description of proposed methods, NR-based channel access schemes for an unlicensed band used in the present disclosure are classified as follows.

- Category 1 (Cat-1): the next transmission immediately follows the previous transmission after a switching gap within a COT, and the switching gap is shorter than 16 us, including even a transceiver turn-around time. Cat-1 LBT may correspond to the above-described Type 2C CAP.
- Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 us may correspond to the above-described Type 2A CAP, and Cat-2 LBT with a minimum sensing duration of 16 us may correspond to the above-described Type 2B CAP. The minimum sensing durations are merely exemplary, and a minimum sensing duration less than 25 us or 16 us (e.g., a minimum sensing duration of 9 us) may also be available.
- Category 3 (Cat-3): an LBT method with fixed contention window size (CWS)i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.
- Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

The following description is given with the appreciation that the term band may be interchangeably used with CC/cell, and a CC/cell (index) may be replaced with a BWP (index) configured within the CC/cell, or a combination of the CC/cell (index) and the BWP (index).

Terms are defined as follows.

- UCI: control information transmitted on UL by the UE. UCI includes various types of control information (i.e., UCI types). For example, the UCI may include an HARQ-ACK (simply, A/N or AN), an SR, and CSI.
- PUCCH: a physical layer UL channel for UCI transmission. For convenience, PUCCH resources configured and/or indicated for A/N, SR, and CSI transmission are referred to as A/N PUCCH resources, SR PUCCH resources, and CSI PUCCH resources, respectively.
- UL grant DCI: DCI for a UL grant. For example, UL grant DCI means DCI formats 0_0 and 0_1, and is transmitted on a PDCCH.
- DL assignment/grant DCI: DCI for a DL grant. For example, DL assignment/grant DCI means DCI formats 1_0 and 1_1, and is transmitted on a PDCCH.
- PUSCH: a physical layer UL channel for UL data transmission.
- Slot: a basic time unit (TU) (or time interval) for data scheduling. A slot includes a plurality of symbols. Herein, a symbol includes an OFDM symbol (e.g., CP-OFDM symbol or DFT-s-OFDM symbol). In this specification, the terms symbol, OFDM-based symbol, OFDM symbol, CP-OFDM symbol, and DFT-s-OFDM symbol may be replaced with each other.
- Performing LBT for channel X/with respect to channel X: This means performing LBT in order to confirm whether to transmit channel X. For example, a CAP may be performed before transmission of channel X is started.

In the NR system, a millimeter wave (mmWave) band, such as a band ranging from 24.25 GHz to 52.6 GHz, may be defined as frequency range 2 (FR2). Meanwhile, in NR-U, operations for use in an unlicensed band in a high frequency band from 52.6 GHz to 100 GHz are also considered, and thus it is necessary to define UE and BS operations for use in the corresponding high frequency band.

In particular, in the present disclosure, a frequency band from 57 GHz to 70 GHz will hereinafter be referred to as a frequency range 4 (FR4), and a method for expanding and operating the NR system will hereinafter be described in consideration of either the regulations of each country of the FR4 band or the other coexistence systems such as the WiGig system operating in the corresponding band.

In European regulations such as ETSI EN 302 567, the mean output power based on Effective Isotropically Radiated Power (EIRP) is 40 dBm as power requirements of the 60 GHz band, and the power spectral density limit is 13 dBm/MHz. In addition, for spectrum access, an adequate spectrum sharing mechanism such as Listen Before Talk (LBT) may be required.

For example, a length of a maximum channel occupancy time (COT) may be less than 9 ms, and a clear channel assessment (CCA) slot duration may be set to 5 µs. In addition, the extended CCA check times may be 8 µs+m×5 µs. Here, m may be an integer randomly selected between 0 and 127.

In addition, the nominal channel bandwidth (NCB) may be set to be 70% or more and 100% or less of a predetermined NCB while following a value determined by the manufacturer. However, the condition for a minimum OCB within the COT is currently not present.

On the other hand, the above-described regulation of the 60 GHz band is written based on ETSI EN 302 567 v2.1.1, and will be added and modified by future updates.

A WiGig (802.11ad/ay) system operating in the 60 GHz band has an NCB of 2.16 GHz. Also, similar to a method for allowing the Wi-Fi (802.11ac/ax, etc.) system operating in 2.4 GHz or 5 GHz to perform LBT in units of 20 MHz before transmission and to transmit/receive signals, the WiGig system may define 2.16 GHz as one channel, and may allow the AP and STSA to perform LBT in units of 2.16 GHz channels and to transmit/receive signals. In addition, in the LBT performed in the channel access procedure, a preamble detection (PD) threshold may be defined as −68 dBm, and an energy detection (ED) threshold may be defined as −48 dBm.

Figure 10:
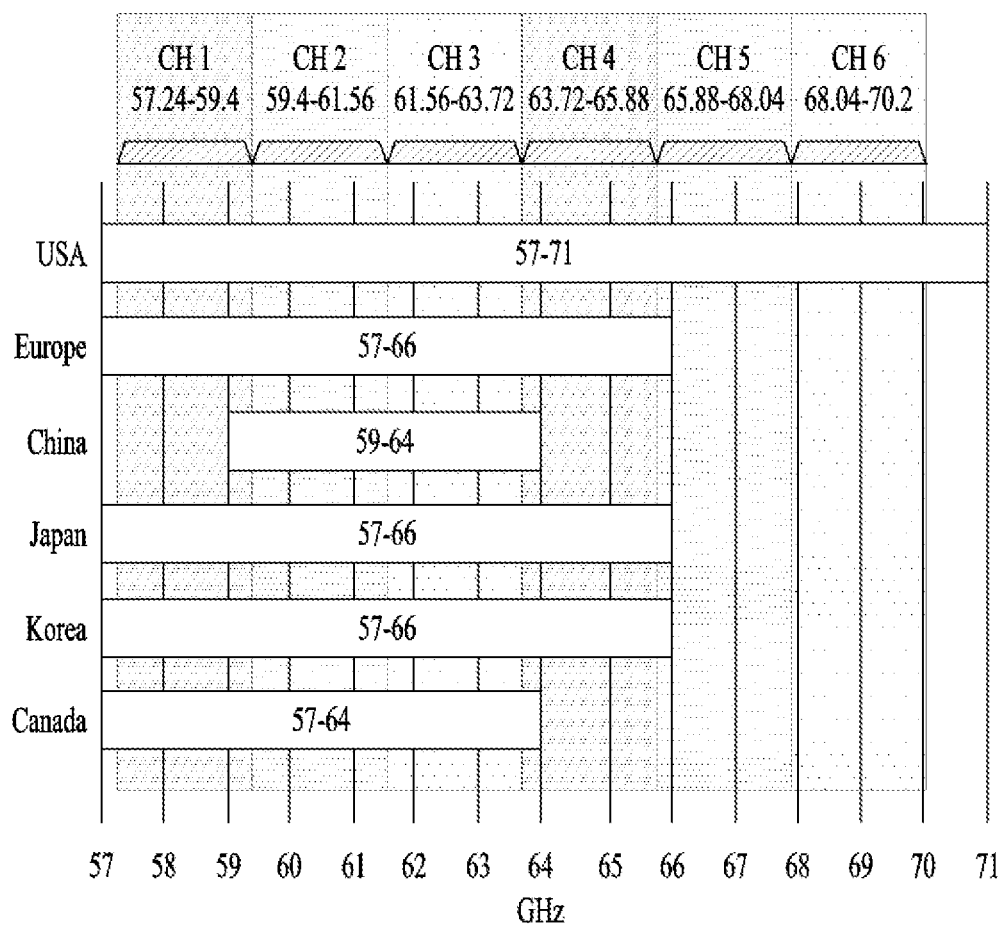
FIG. 10 illustrates an example of channelization in high-frequency bands for each country.

On the other hand, a channelization status of the 60 GHz band for each country is shown in FIG. 10.

Meanwhile, as shown in the following Equation 1, the equations (formulas) between the PHY parameters defined in the Wi-Fi (802.11ac/ax) system may also be equally applied to the WiGig (802.11ad/ay) system.

aSIFSTime=aRxRFDelay+aRxPLCPDelay+
    aMACProcessingDelay+aRxTxTurnaroundTime aSlotTime=aCCATime+aRxTxTurnaroundTime+aAir-
    PropagationTime+aMACProcessingDelay.

PIFS=aSIFSTime+aSlotTime

DIFS=aSIFSTime+2×aSlotTime [Equation 1]

In addition, the result of comparing the main PHY parameters of Wi-Fi (802.11ac/ax) with the main PITY parameters of the WiGig (802.11ad/ay) system is shown in Table 10.

TABLE 10

| PHY parameter | Value (802.11ad/ay) | Value (802.11ac/ax) |
|---|---|---|
| aRIFSTime | 1 µs | 2 µs |
| aSIFSTime | 3 µs | 16 µs |
| aRxTxTurnaroundTime | <1 µs | <2 µs |
| aCCATime | <3 µs | <4 µs |
| aRxTxSwitchTime | <1 µs | <<1 µs |
| aAirPropagationTime | <100 ns | <<1 µs |
| aSlotTime | 5 µs | 9 µs |
| aCWmin | 15 | 15 |
| aCWmax | 1023 | 1023 |

Referring to Equation 1 and Table 10, when a gap between Wi-Fi transmissions is set to 16 µs, 16 µs Cat-1 LBT and 16 µs Cat-2 LBT may correspond to 3 µs Cat-1 LBT and 3 µs Cat-2 LBT in the WiGig system, respectively. When a gap between transmissions is set to 25 µs, 25 µs Cat-2 LBT may correspond to 13 µs Cat-2 LBT in the WiGig system.

In order to design the NR system scheduled to operate in the FR4 hand, the present disclosure proposes a method for performing a channel access procedure for uplink (UL) and downlink (DL) transmission/reception in an unlicensed high frequency band in consideration of the above 60 GHz-hand regulations and other coexistence systems (e.g., WiGig), and also proposes UL and DL transmission/reception methods.

In order to transmit a signal by the base station (BS) (or AP) or the UE (or STA) in the 2.4 GHz or 5 GHz unlicensed bands, the channel access procedure such as LBT is performed, and it is determined whether the channel is idle or busy, so that it can be determined whether to transmit signals.

Similarly, it may be necessary to perform a channel access mechanism such as LBT even in a high-frequency unlicensed band such as 60 GHz. Whereas a channel access procedure similar to the Wi-Fi system was performed in LIE LAA or NR-U, the NR system scheduled to operate in the FR4 band may be different from the legacy Wi-Fi system in terms of a unit bandwidth (where the NR system performs LBT with another coexistence system such as WiGig) or transmission/reception (Tx/Rx) procedures, so that a new channel access method may be required.

Specifically, taking WiGig as an example, WiGig may transmit and receive the 2.16 GHz bandwidth on a channel basis, may set the ED threshold to −48 dBm, may perform CAT-4 LBT, and may thus transmit a maximum (max) output power at 40 dBm. Based on the above description, a method for setting the CAT-4 LBT BW, the maximum output power and the ED threshold when the size of a CC BW of the NR system operating in the FR4 band is equal to or smaller than an LBT BW of another coexistence system such as WiGig will hereinafter be described in detail.

For convenience of explanation in the present disclosure, since the following disclosure will mainly propose a method for setting the maximum output power and the ED threshold values based on the CC BW of the NR system operating in the FR4 band, a reference LBT parameter set will be defined as {reference (LBT) BW, reference (max output) power, reference ED} for clear description and generalization.

The respective parameters (i.e., reference (LBT) BW, reference (max output) power, and reference ED) may be set to a (nominal) system BW regulated/defined in the U-band regulations and/or the non-3GPP RAT, the maximum output power that is allowed in or corresponds to the corresponding 13 W size, and the ED threshold that is applied for LBT execution based on the corresponding BW and/or power. For example, when the WiGig system is considered as a reference coexistence system, the reference LBT parameter set may be defined as {WiGig LBT BW or CH BW (Z=2.16 GHz), Pmax(=40 dBm). TWiGig(=−48 dBm)}.

For convenience of description, the embodiments described in the present disclosure may define the WiGig system as a reference coexistence system, and a detailed description thereof will be given based on this definition. However, the following embodiments are not necessarily applied only to the WiGig system serving as a reference coexistence system, and if the WiGig system is a wireless communication system that can coexist with the NR-U system in the FR4 band defined and described in the present disclosure, any system may be defined as a reference coexistence system, so that the following embodiments may be applied to this defined system.

Figure 11:
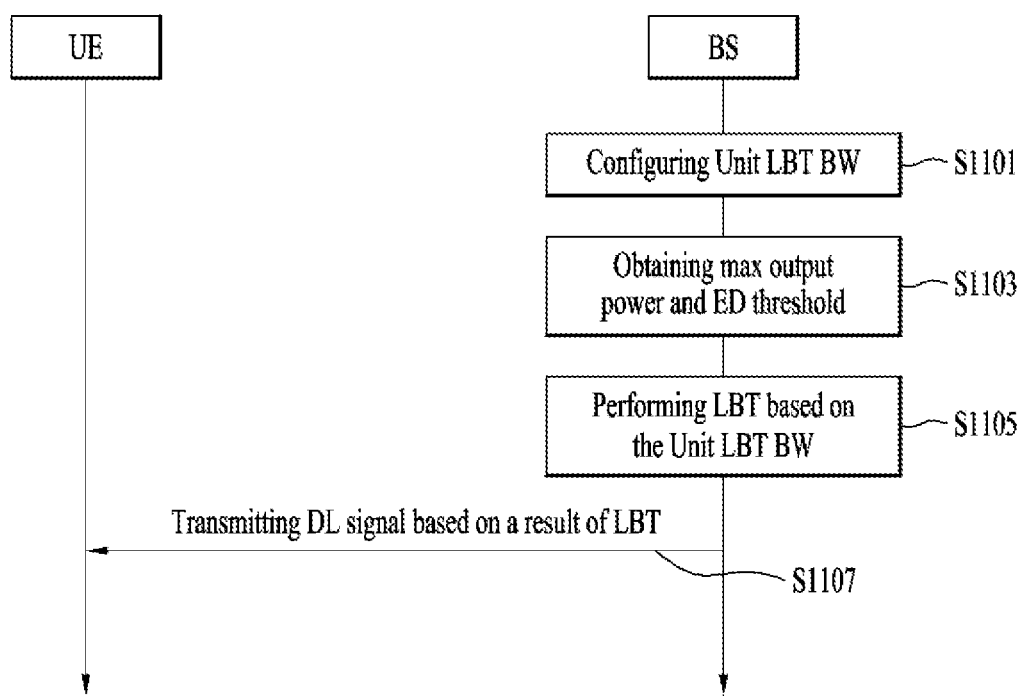
FIGS. 11 to 12 are flowcharts illustrating the overall operation procedures of a base station (BS) and a user equipment (UE) for use in uplink (UL) and/or downlink (DL) transmission/reception according to an embodiment of the present disclosure.
Figure 12:
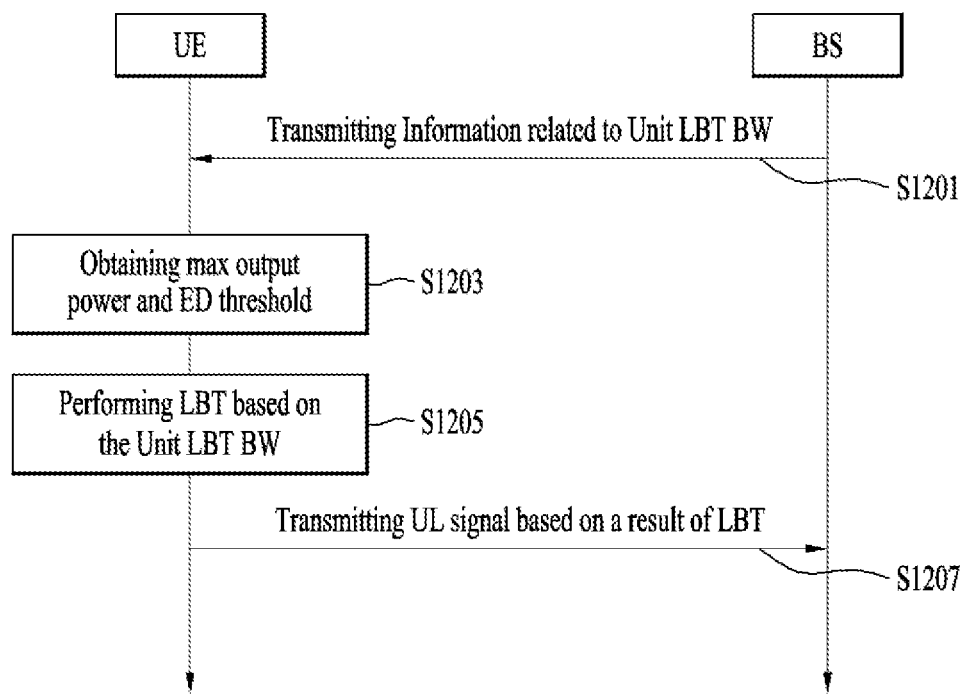

FIGS. 11 to 12 are flowcharts illustrating the overall operation procedures of the base station (BS) and the user equipment (UE) according to an embodiment of the present disclosure.

FIG. 11 is a flowchart illustrating the overall operation procedure for transmitting and receiving a downlink signal according to embodiments of the present disclosure.

Referring to FIG. 11, the base station (BS) may configure the unit LBT BW (S1101), and may obtain the maximum output power and the ED threshold for a downlink signal (S1103). At this time, the maximum output power and the ED threshold may be obtained based on the unit LBT BW. An example of the method for configuring the unit LBT BW, the maximum output power and the ED threshold, and examples of the unit LBT BW, the maximum output power, and the ED threshold may be configured based on Proposed Method #1 and Proposed Method #2.

The base station (BS) may perform LBT based on the ED threshold configured in units of the configured unit LBT BW (S1105), and may transmit the downlink signal to the UE, based on the configured maximum output power according to the LBT result (S1107). In this case, the method for transmitting a specific downlink signal may be configured based on the following [Proposed Method #1] to [Proposed Method #3].

FIG. 12 is a flowchart illustrating the overall operation procedure for transmitting and receiving an uplink signal according to an embodiment of the present disclosure.

Referring to FIG. 12, the base station (BS) may transmit information for configuring the unit LBT 13 W to the UE (S1201). At this time, the information for configuring the unit LBT BW may be transmitted through a radio resource configuration (RRC) signal, or may be transmitted through downlink control information (DCI). In addition, the step S1201 may be omitted, and the unit LBT BW may be preset in the UE.

The UE may obtain the maximum output power and the ED threshold (S1203). In this case, the maximum output power and the ED threshold may be configured based on the configured unit LBT BW. An example of the method for configuring specific unit LBT BW, the maximum output power, and the ED threshold, and examples of the unit LBT BW, the maximum output power, and the ED threshold may be configured based on Proposed Method #1 and Proposed Method #2.

The UE may perform LBT based on the ED threshold in units of the configured unit LBT BW (S1205), and may transmit an uplink signal to the BS based on the configured maximum output power according to the LBT result (S1207). In this case, a method for transmitting the uplink signal may be configured based on Proposed Method #1 to Proposed Method #3.

[Proposed Method #1]

A component carrier (CC) BW of the LE or BS may be set to Y≤WNR≤Z. Here, WNR may be a CC BW of the BS or UE, Z may be an LBT BW of another coexistence system (e.g., WiGig). In addition, Y may refer to a minimum BW in which the maximum output power of the system defined in the regulations is allowed. For example, the maximum output power may be used as a reference power, and may be set to 40 dBm.

Specifically, Y may refer to the BW size determined by 'PSD limi=L (dBm/MHz)' and 'Pmax (dBm)', and may be a value satisfying 'Y (dB)+L (dBm/MHz)=Pmax (dBm)'. In addition, TWiGig may refer to the above reference ED threshold.

For example, TWIG may be an ED threshold used when another coexistence system (eg, WiGig) performs CAT-4 LBT. Further, Pmax may refer to the maximum (max) output power of the UE or the BS, or may refer to a maximum output power of the system defined in the regulations. For example, the maximum output power of the system may be used as reference power, and may be set to 40 dBm.

As a more specific example, when L is set to 13 dBm/MHz (i.e., L=13 dBm/MHz) and Pmax is set to 40 dBm, Y becomes 500 MHz (27 dB). Accordingly, when the LBT parameter set is defined as {BW, (max output) power, ED}, the NR system may be defined as {WNR, PNR, TNR}. In addition, a parameter set of another coexistence system (e.g., WiGig) considered as a reference parameter set for defining a parameter set of the NR system may be expressed {Z, Pmax, TWiGig}.

A detailed description thereof will be given in more detail with reference to FIGS. 13 and 14.

Figure 13:
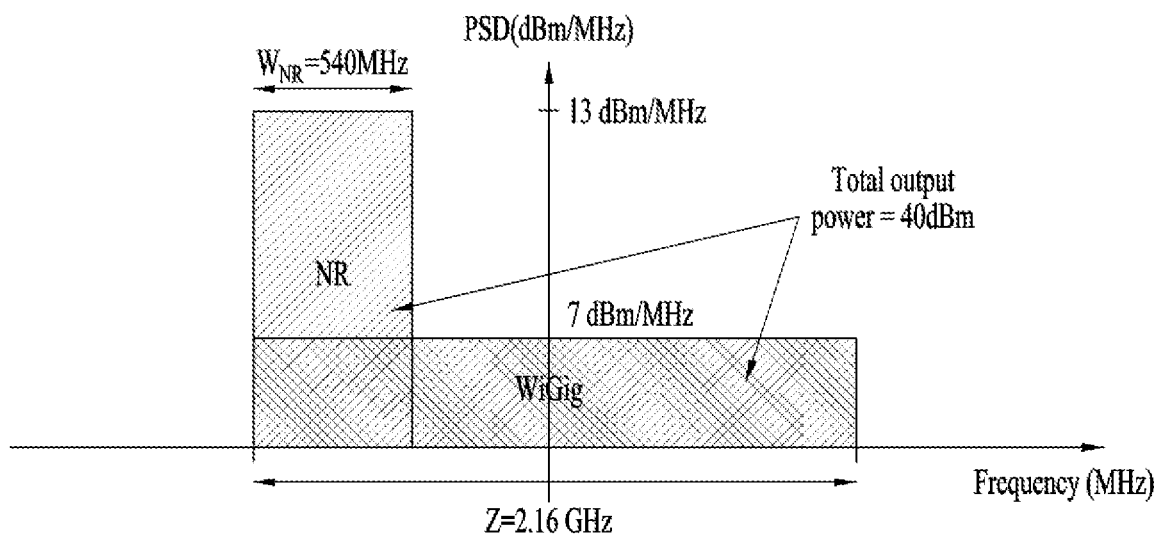
FIGS. 13 and 14 are diagrams illustrating examples in which NR carriers are configured in a high-frequency band according to an embodiment of the present disclosure.

Referring to FIG. 13, when LBT (e.g., CAT-4 LBT) is performed in units of "Z=2.16 GHz" based on the ED threshold (=−48 dBm) of another coexistence system (e.g., WiGig) and signals are transmitted at the maximum output power (=40 dBm), the UE or BS in which 540 MHz CC 13 W is set may be configured in the LBT 13 W of another coexistence system (e.g., WiGig) as shown in FIG. 13.

In FIG. 13, in a situation where the power requirement in the regulations is set to a maximum PSD limit (=13 dBm/MHz) and the maximum output power is set to 40 dBm, if the other coexistence system (e.g., WiGig) and the NR carrier are used for signal transmission using the corresponding maximum bandwidth, the maximum power spectral density (PSD) of the other coexistence system is set to 7 dBm/MHz and the maximum PSD of the NR carrier is set to 13 dBm/MHz, and thus the total output power of each of the other coexistence system and the NR carrier is equally set to 40 dBm. Therefore, in a situation where the CC BW of the NR carrier occupies only some parts of the LBT BW of the other coexistence system (e.g., WiGig), if signal transmission is performed through the NR carrier, it is considered that a channel is busy from the standpoint of a node of the other coexistence system (e.g., WiGig), so that signal transmission of the other coexistence system (e.g., WiGig) may be delayed.

Figure 14:
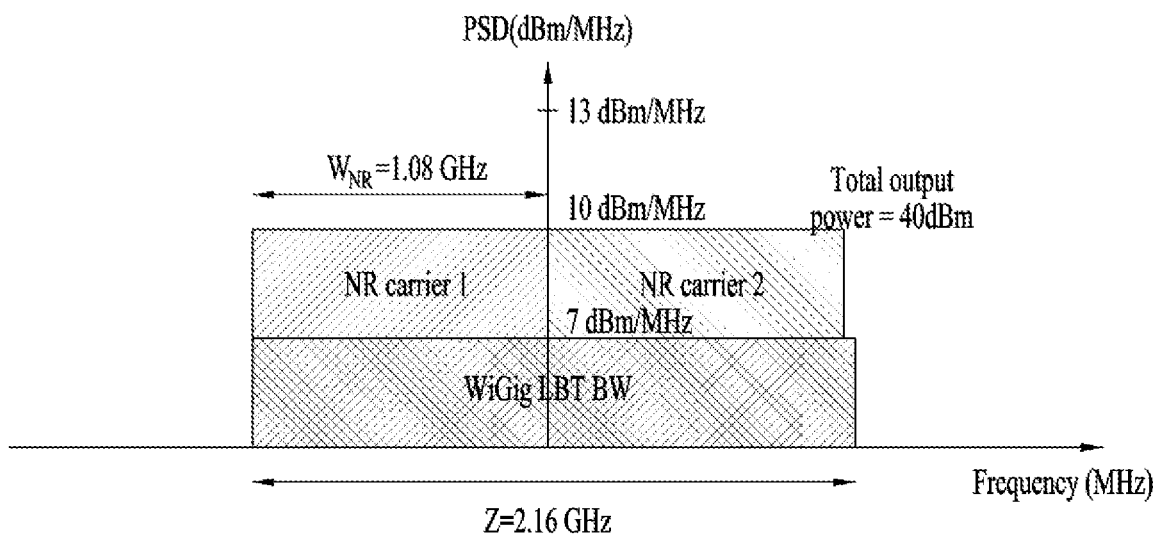

Referring to FIG. 14, in a situation where two NR carriers of a CC BW of 1.08 GHz are configured in the LBT BW of the other coexistence system (e.g., WiGig) of 2.16 GHz, if each of NR carrier 1 or NR carrier 2 is used for data transmission with the total output power (=40 dBm), it is considered that a channel is busy from the standpoint of a node of the other coexistence system (e.g., WiGig), so that signal transmission of the other coexistence system (e.g., WiGig) may be delayed.

Therefore, as can be seen from FIGS. 13 to 14, when the NR system coexists with the other system such as WiGig, there is a need for a method for allowing the other coexistence system and the NR system to communicate with each other through efficient coexistence of the other coexistence system and the NR system, and a detailed description thereof will hereinafter be given with reference to the attached drawings.

Embodiment #1-1

The UE or the BS may set the unit LBT BW performing LBT (e.g., CAT-4 LBT) to be equal to the CC BW of the NR system, may always transmit signals with the maximum output power (=Pmax (dBm)), and may perform LBT based on the ED threshold (=TWiGig (dBm)). In this case, the CC BW may be equal to or smaller than the reference BW "Z" (e.g., LBT BW of WiGig). In other words, the LBT parameter set of the NR system may be set to {WNR(<Z), Pmax, TWiGig}.

In this case, when the CC BW of the NR UE or BS is set to WNR<Y, power generated when data equal in size to CC BW is transmitted with the maximum PSD defined in the regulations is set to the maximum output power, and thus the ED threshold may be configured based on this power. For example, the maximum output power may be calculated using "CC BW×max PSI" of the NR, and the ED threshold may be determined based on the corresponding maximum output power.

Specifically, the embodiment #1-1 discloses a method in which the NR carrier sets the unit LBT BW performing LBT (e.g., CAT-4 LBT) to be equal to the CC BW of the NR system, signals are always transmitted with "max output power=Pmax (dBm)", and thus LBT is performed based on "ED threshold=TWiGig (dBm)". For example, if the maximum PSD limit allowed by the regulations is set to 13 dBm/MHz and Pmax is set to 40 dBm, the UE or BS may transmit signals based on the same maximum output power as the maximum output power transmitted by the node of another coexistence system (e.g., WiGig) at 2.16 GHz through the NR carrier of the CC BW of Y=540 MHz or higher.

Therefore, in a situation where the NR carrier of the CC BW of 540 MHz or higher occupies only some parts of the LBT BW of the other coexistence system (e.g., WiGig), the node of the other coexistence system (e.g., WiGig) may consider that the entirety of the 2.16 GHz channel corresponding to the BW of the corresponding system is busy due to signal transmission through the NR carrier.

Therefore, in a situation where the ED threshold for a plurality of NR carriers in the LBT BW of the other coexistence system (e.g., WiGig) is set to "TWiGig=-48 dBm" in the same way as the other coexistence system, if it is determined that signals are being transmitted through one or more carriers from among two NR carriers, the node of the other coexistence system (e.g., WiGig) may determine the entirety of the 2.16 GHz channel corresponding to the BW of the other coexistence system to be busy, thereby delaying signal transmission.

On the other hand, since the UE or the BS performs CAT-4 LBT based on the CC BW of the NR carrier, the number of channel access opportunities may increase compared to those of the node of the other coexistence system (e.g., WiGig) configured to perform CAT-4 LBT in units of 2.16 GHz.

If the embodiment #1-1 is expressed as an LBT parameter set, the result of expression may be denoted by WNR(<Z), Pmax, TWiGig}. In other words, the embodiment #1-1 discloses a method in which LBT is performed for the unit LBT BW of LBT BW or less of the other coexistence system (e WiGig), the ED threshold used in LBT execution and the maximum output power used in signal transmission can also be used in the same way as the other coexistence system (e.g., WiGig).

If the CC BW of the NR UE or BS is WNR<Y, the power generated when data equal in size to CC BW is transmitted using the maximum PSD defined in the regulations is set to the maximum output power, so that the ED threshold can be configured based on this maximum output power.

Embodiment #1-2

The UE or the BS may set the unit LBT BW performing LBT (e.g., CAT-4 LBT) to be equal to 'Z' (e.g., LBT BW of WiGig) corresponding to a reference 13 W, may always transmit signals based on "max output power=Pmax (dBm)", and may perform LBR using "ED threshold=TWiGig (dBm)". In other words, the LBT parameter set of the NR system may be set to {Z, Pmax, TWiGig}.

If the CC BW of the NR UE or BS is set to WNR<Y, the power generated when data equal in size to CC BW is transmitted using the maximum PSD defined in the regulations is set to the maximum output power, so that the ED threshold can be configured based on this maximum output power.

In other words, the embodiment #1-2 may set the unit LBT BW in which the UE or BS performs LBT (e.g., CAT-4 LBT) to be the same as "Z" (e.g., LBT BW of WiGig) as the reference 13 W, may always transmit signals based on "max output power=Pmax (dBm)", and may perform LBT based on "ED threshold=TWiGig. (dBm)", such that the embodiment #1-2 can consider fair coexistence with the other coexistence system (e.g., WiGig).

If the embodiment #1-2 is expressed as an LBT parameter set, the result of expression may be denoted by {Z, Pmax, TWiGig}. That is, the unit LBT BW may be set to Z (e.g., the same LBT BW as WiGig) corresponding to the reference BW, and may set the maximum output power to 'Pmax' (i.e., max output power=Pmax), resulting in "ED threshold=TWiGig".

If the CC BW of the NR UE or BS is set to WNR<Y, power generated when data equal in size to CC BW is transmitted with the maximum PSI) defined in the regulations is set to the maximum output power, and thus the ED threshold may be configured based on the resultant maximum output power. For example, "CC BW×max PSD=max output power" of the NR system is calculated, and the ED threshold may be determined according to the corresponding maximum output power.

Embodiment #1-3

In a situation where the UE or the BS may set the unit LBT BW performing LBT (e.g., CAT-4 LBT) to be equal to the CC BW of the NR, if WNR corresponding to the CC BW is equal to "Z" (e.g., LBT BW of WiGig) corresponding to the reference BW, signals may be transmitted with "max output power=Pmax (dBm)", and LBT may be performed based on "ED threshold=TWiGig (dBm)". On the other hand, when the WNR is smaller than "Z" corresponding to the reference BW (e.g., LBT BW of WiGig), "max output power=PNR" lower than "Pmax" may be configured in proportion to the WNR size compared to the Z value, and LBT may be performed using "ED threshold=TNR" higher than TWiGig by a PNR reduced compared to Pmax. In other words, the LBT parameter set of the NR system may be set to {WNR(<Z), PNR (<Pmax), TNR(>TWiGig)}.

If the CC BW of the NR UE or BS is set to WNR<Y, the maximum output power and the ED threshold may be determined according to the same principle as above. For example, "max output power=PNR" lower than Pmax in proportion to the WNR size compared to 'Y' may be configured, "ED threshold=TNR" higher than Pmax by a reduced PNR may be configured, so that the LBT can be performed based on the configured TNR.

In Embodiment #1-3, the UE or the BS may set the unit LBT BW performing LBT (e.g., CAT-4 LBT) to be the same as the CC BW of NR. When the WNR corresponding to the CC BW is equal to Z (e.g., WiGig LBT BW) indicating the reference BW, signals are transmitted based on "max output power=Pmax (dBm)" as shown in Embodiment #1-2, and LBT can be performed using "ED threshold=TWiGig (dBm)".

On the other hand, when WNR is smaller than Z (for example, LBT BW of WiGig) indicating the reference BW, signals are transmitted using "max output power=PNR" that is lower than Pmax in proportion to the size of WNR compared to Z, "ED threshold=TNR" higher than TWiGig by a reduced max output power, so that LBT can be performed based on the configured TNR.

For example, referring to FIG. 14, since the CC BW of each of NR carrier 1 and NR carrier 2 is 1.08 GHz, which is half of 2.16 GHz corresponding to LBT BW of WiGig, the UE or BS may perform CAT-4 LBT in units of 1.08 GHz.

Since the NR system performs LBT with an LBT BW smaller than WiGig, the maximum output power for each carrier can be reduced compared to Pmax of WiGig and transmitted. In addition, the ED threshold may be configured to be inversely proportional to the maximum output power. That is, when a signal is transmitted based on a smaller amount of power, the UE or the BS performs LBT using the increased ED threshold to reduce the sensitivity indicating whether LBT is successful, thereby increasing a channel access opportunity in the N system. In other words, instead of reducing the maximum output power of the NR carrier compared to Pmax, the ED threshold is increased by the reduced maximum output power compared to TWiGig, and the UE or the BS may perform LBT based on the increased ED threshold.

Embodiment #1-3 may be expressed as an LBT parameter set, which may be {WNR(<Z), PNR (<Pmax), TNR(>TWiGig)}. That is, according to the method of Embodiment #1-3, an LBT BW equal to or less than the LBT BW of another coexistence system (e.g., WiGig) is set, the maximum output power reduced compared to Pmax is set, and an ED threshold increased compared to TWiGig is then set. When the CC BW of the NR UE or BS is set to WNR<Y, the power generated when data equal in size to CC BW is transmitted based on the maximum PSD defined in the regulations may be set to the maximum output power. For example, "CC BW×max PSD=max output power" of the NR system is calculated. Meanwhile, the ED threshold may be set or determined according to the same principle as described above in Embodiment #1-3.

Embodiment #1-4

In a situation where the UE or the BS may set the unit LBT BW performing LBT (e.g., CAT-4 LBT) to be equal to the CC 13 W of the NR, if WNR corresponding to the CC BW is equal to "Z" (e.g., LBT BW of WiGig) corresponding to the reference BW, signals may be transmitted with "max output power=Pmax (dBm)", and LBT may be performed based on "ED threshold=TWiGig (dBm)".

On the other hand, when WNR is smaller than Z, which is the reference BW (e.g., LBT BW of WiGig), the maximum output power uses Pmax (dBm) without change, and the ED threshold may be set in a manner that LBT can be performed based on "ED threshold=TNR" that is further reduced compared to TWiGig in proportion to the size of WNR compared to the Z value indicating the reference BW. In other words, the LBT parameter set of the NR system may be set to {WNR(<Z), PNR(<Pmax), TNR(<TWiGig)}.

When the CC BW of the NR UE or BS is set to WNR<Y, power generated when data equal in size to CC BW is transmitted with the maximum PSD defined in the regulations is set to the maximum output power. For example, "CC BW×max PSD=max output power" of the NR system is calculated. Meanwhile, the ED threshold may be set or determined according to the same principle as described above in Embodiment #1-4.

However, the CC BW of the NR UE or BS cannot be configured across LBT BWs of a plurality of other coexistence systems (e.g., WiGig) or channels of other coexistence systems (e.g., WiGig) channels. In addition, when simultaneous transmission of data is performed through a plurality of NR carriers within Z, the PSD of each carrier may be reduced and transmitted in order to comply with the maximum output power regulation. In addition, the CC may refer to a CC having a. BW equal to or greater than a minimum BW through which the maximum output power of 40 dBm can be transmitted according to U-band regulations. In addition, in the case of a CA situation between the plurality of CCs, this CC 13 W may refer to the entire aggregated BW obtained by combining BWs of the plurality of CCs.

In Embodiments #1-4, in a situation where the UE or the BS sets the unit LBT BW performing LBT (e.g., CAT-4 LBT) to be the same as the CC 13 W of NR, if the WNR corresponding to the CC BW is equal to the Z value (e.g., WiGig LBT BW) indicating the reference BW, signals may be transmitted based on "max output power=Pmax (dBm)" in the same manner as in Embodiment #1-2, and LBT may be performed using "ED threshold=TWiGig (dBm)".

When WNR is smaller than the Z value (e.g., LBT BW of WiGig) indicating the reference BW, the maximum output power may use "Pmax (dBm)" without change, and the ED threshold may be set in a manner that "ED threshold=TNR" that is further reduced compared to TWiGig in proportion to the size of WNR can be used.

In this case, although the CC BW WNR and the LBT of the NR carrier are smaller than the LBT BW of other coexistence systems (for example, WiGig), the minimum CC 13 W that can transmit 40 dBm is set to Y or more, so that it is possible to transmit up to "max output power=40 dBm" in response to the PSD limit allowed by the regulations.

However, in consideration of fair coexistence with other coexistence systems (e.g., WiGig), the maximum output power can be used in the same manner as in the other coexistence systems (e.g., WiGig), but the ED threshold used when CAT-4 LBT is performed may be set to be lower than the other coexistence system (e.g., WiGig). For example, the ED threshold may be configured to be reduced by the ratio of the LBT BW of the NR carrier BW (WNR) to the LBT BW of another coexistence system (e.g., WiGig), and it can be more sensitively determined whether the channel is idle or busy during the LBT of the NR carrier BW (WNR), so that the number of channel access opportunities of the NR carrier becomes smaller than those of the other coexistence system (e.g., WiGig) structured to use the same ED threshold as described above.

For example, referring to FIG. 14, since the size of the LBT BW of each of NR carrier 1 and NR carrier 2 is ½ of the size of the LBT BW of WiGig, the ED threshold may be set to −51 dBm that is 2 times lower than the WiGig, and the maximum output power may be set to 40 dBm in the same manner as in WiGig. In other words, if the embodiment #1-4 is expressed as an LBT parameter set, the result of expression may be denoted by {WNR(<Z), Pmax, TNR (<TWiGig)}. That is, LBT BW equal to or smaller than the LBT 13 W of the other coexistence system (e.g., WiGig) may be configured, the same maximum output power as the other coexistence system (e.g., WiGig) may be configured, and LBT may be performed based on the ED threshold lower than the ED threshold of the other coexistence system (e.g., WiGig).

When the CC BW of the NR UE or BS is set to WNR<Y, the power generated when data equal in size to CC BW is transmitted based on the maximum PSD defined in the regulations may be set to the maximum output power. For example, "CC BW×max PSD=max output power" of the NR system is calculated. Meanwhile, the ED threshold may be set or determined according to the same principle as described above in Embodiment #1-3.

Embodiment #1-5

In Embodiment #1-5, in a situation where the CC BW of the NR UE or BS is set to WNR<Y, even if signals are transmitted using the maximum PSD defined in the regulations because the CC BW of the NR UE or BS is small, so that the maximum output power cannot reach the reference power (e.g., 40 dBm). A detailed description thereof will hereinafter be given.

In this case, the unit LBT BW performing LBT (e.g., CAT-3 LBT or CAT-4 LBT) is configured to be equal to either the Z value indicating a reference 13 W (e.g., LBT BW of WiGig) or the CC BW of the NR system, and power generated when data equal in size to CC 9 W is transmitted based on the maximum PSD is set to the maximum output power, so that the ED threshold can be set based on the resultant maximum output power. For example, "CC BW×max PSD" of the NR system is calculated to be equal to the maximum output power, so that the ED threshold can be determined according to the corresponding maximum output power.

In other words, according to the method of Embodiment #1-5, although signals are transmitted using the maximum PSD defined in the regulations in a situation where the CC BW of the BS or UE operating in the FR4 band is small, if the maximum output power does not reach the reference power (e.g., 40 dBm), the maximum output power and the ED threshold can be configured based on the above result.

For example, when the CC BW of the NR UE or BS is set to WNR<Y, the unit LBT BW in which the UE or the BS performs LBT (e.g., CAT-3 LBT or CAT-4 LBT) is set to be equal to the CC BW of NR or the Z value indicating the reference BW (e.g., LBT BW of WiGig), and power generated when data equal in size to CC BW is transmitted based on the maximum PSI) is set to the maximum output power, so that the ED threshold can be set based on the resultant maximum output power.

For example, when the PSD limit is 13 dBm/MHz and the CC BW is set to 270 MHz (CC BW=270 MHz), the maximum output power may be set to 37 dBm according to the following equation 2.

$$P_{max} \text{ (dBm)}=10 \cdot \log 1(19.953 \cdot 10^{-8} \text{ (mW/MHz)} \cdot \text{BWMHz (MHz))} \quad \text{[Equation 2]}$$

In addition, in order to calculate the ED threshold, similar to a maximum ED threshold calculation procedure defined in TS 37.213 Section 4.2.3.1, the constant values of TA, PH, and PTX shown in Equation 3 can be appropriately substituted with values to be defined in the FR4 band, Therefore, when the CC BW is small, a reduced maximum output power may be set, and LBT may be performed based on an ED threshold that is increased in proportion to the reduced maximum output power.

[Equation 3]
$$X'_{Thresh\_max} = \max\left\{ \begin{array}{l} -48 + 10 \cdot \log 10(\text{BWMHz}/2.16 \text{ GHz}) \text{ dBm}, \\ \min\left\{ \begin{array}{l} P_{max}, \\ P_{max} - TA + \left(P_H + 10 \cdot \log 10\left(\text{BWMHz} \frac{}{2.16 \text{ GHz}}\right)\right) - P_{RX} \end{array} \right\} \end{array} \right\}$$

Here, TA, PH, and PTX may be values defined for the FR4 band. In addition, Pmax may be derived using the equation of Equation 2.

[Proposed Method #2]

In Proposed Method #2, a 2-step LBT method implemented by combining wideband LBT (e.g., CAT-4 LBT) and narrowband LBT (e.g., CAT-4 LBT) of the NR BS or UE and a method for setting an ED threshold to be used in the corresponding 2-step LBT and the maximum output power will hereinafter be described in detail.

(1) Step #1: Execution of 1st Wideband LBT (e.g., CAT-4 LBT)

When the NR BS or the UE succeeds in LBT based on the reference LBT parameter set, DL or UL transmission is possible through NR CC(s) based on the reference (max output) power (e.g., the same maximum output power as WiGig). In other words, the 1st wideband LBT may perform LBT by setting the LBT parameter set based on Embodiment #1-2 of Proposed Method #1. Also, the reference LBT parameter set may be an LBT parameter set used in the other coexistence system (e.g., WiGig). If the other coexistence system is WiGig, the reference LBT parameter set may be {WiGig LBT BW or CH BW (Z=2.16 GHz), Pmax (=40 dBm), TWiGig (=−48 dBm)}.

(2) Step #2: Execution of 2nd Narrow Band LBT (e.g., CAT LBT)

When the $1^{st}$ wideband LBT fails, a specific narrow band smaller in size than the corresponding wideband BW and being included in the wideband LBT BW in which the $1^{st}$ wideband LBT was attempted may be set to the LBT BW, so that it is possible to perform the $2^{nd}$ narrow band LBT.

In this case, a plurality of narrowbands constructing the wideband and a narrowband which is a target to perform LBT from among the narrowbands may be promised in advance or may be semi-statically or dynamically configured/indicated by the BS.

For example, the BS may configure/instruct a narrowband to be subjected to LBT through an RRC signal and/or DCI. In this case, the RRC signal and/or DCI may include information about a narrowband size and information about a narrowband position. As another example, the RRC signal and/or the DCI may include information about the start frequency position of the narrowband and information about the narrowband size. In this case, the UE may perform LBT for a frequency band of consecutive resource blocks (RBs) as much as the narrowband size starting from the corresponding start frequency position or may perform LBT, or may perform LBT for a frequency band of resource block groups (RBGs), In this case, the size of the narrowband may be expressed in units of RB and/or RBG, and the start frequency position may be represented by a relative position with respect to the wideband. For example, the start frequency position may be represented by a relative distance (expressed in units of RB/RBG) from the lowest (or highest) RB/RBG of wideband. In other words, the start frequency position may be represented by an offset value.

As another example, the RRC signal and/or DCI may include a Start and Length Indicator Value (SLIV) value for indicating the location and size of the narrowband. When the BS transmits the RRC signal and/or DCI including the SLIV to the UE, the UE can derive the start RB/RBG of the narrowband and the number of RBs corresponding to the RB size of the narrowband, based on the corresponding SLIV. In addition, based on the start RB/RBG and the number of RBs, the UE may recognize a target narrowband to be subjected to LBT.

On the other hand, the corresponding narrowband may be configured/instructed by a combination of RRC signal and DCI. The BS may transmit the sizes of narrowband candidates and the positions of narrowband candidates to the UE, and may instruct one candidate size and one candidate position from among the candidate sizes and the candidate positions through the DCI. Then, the UE may perform narrowband LBT based on the candidate size and candidate, position instructed through the DCI. Alternatively, the BS may transmit information on the plurality of narrowbands included in the wideband through the RRC and may instruct any one narrowband through the DCI. For example, when the BS transmits the number of narrowbands included in the wideband to the UE through the RRC signal, the UE divides the entire wideband by the number of narrowbands to obtain the size and location of a plurality of narrowbands, and the BS may designate a specific value through DCI. In this case, the sizes of the plurality of narrowbands included in the wideband may be the same.

When the narrowband is configured/instructed by a combination of RRC signal and DCI, the BS transmits the narrowband candidate sizes and the narrowband candidate positions to the UE through the RRC signal. In this case, the transmitted information may be formed in a table shape. For example, the respective candidate sizes may be mapped to the respective candidate positions, so that the mapped result is formed in a table shape. When the BS instructs a row index through DCI, the UE may perform narrowband LBT based on the narrowband size corresponding to the row index instructed by the corresponding table and the narrowband position. At this time, the narrowband size and the narrowband position may be information on the starting frequency position of the narrowband and the narrowband size as described above, and the method of performing LBT using the above information may be the same as described above.

In addition, the narrowband candidate sizes and the narrowband candidate positions may not be configured through the RRC signal, but may be preset in the UE in the form of the above table.

As another example, before performing wideband LBT, the UE will receive scheduling information (e.g., UL grant) for uplink transmission from the BS, and the corresponding scheduling information may include information on frequency resources for uplink. Therefore, the UE that has failed to perform wideband LBT, based on the uplink scheduling information, may perform narrowband LBT equal in size to a bandwidth ranging from the lowest RB/RBG (or from RB/RBG lower than the lowest RB/RBG by a first offset value) of frequency resources scheduled for uplink to the highest RB/RBG (or to RB/RBG higher than the highest RB/RBG by a second offset value) of scheduled frequency resources. In this case, the first offset value and the second offset may be equal to each other or may be different from each other.

In addition, the UE may determine a narrowband band by increasing a frequency band range in units of a predetermined RB/RBG until exceeding the highest RB/RBG (or a higher RB/RBG that is increased by a second offset value) of frequency resources scheduled from the lowest RB/RBG (or from RB/RBG lower than the lowest RB/RBG by a first offset value) of frequency resources scheduled for uplink, and may perform LBT on the corresponding narrowband band. In this case, the first offset value and the second offset may be equal to each other or may be different from each other.

For example, it is assumed suppose that narrowband LBT is performed at SCS 120 kHz of FR2 defined in 3GPP TS 38.104 Rel16. If uplink is scheduled within the range of a 75 MHz frequency band and the unit band corresponding to a certain RB/RBG unit is 50 MHz (i.e., 32 RBs), the UE may double (or more than double) a frequency range in units of 50 MHz from the lowest RB/RBG (or RB/RBG lower than the lowest RB/RBG by a first offset value) of the scheduled frequency resources, so that the UE can perform LBT in a narrowband corresponding to 100 MHz (i.e., 66 RBs).

In addition, the BS may configure/instruct a target narrowband to be used for LBT, or may semi-statically (e.g., RRC signal) or dynamically (e.g., DCI) configure/instruct the ED threshold to be used separately for narrowband LBT and/or the maximum output power to be used for uplink transmission and then inform the UE of the configured/instructed information. Otherwise, the ED threshold to be used for narrowband LBT and/or the maximum output power to be used for uplink transmission may be promised in advance. That is, for the narrowband LBT, in a state that a specific narrowband to be subjected to LBT is considered as NR CC BW, the LBT parameter set may be configured based on the embodiment #1-1, #1-3 or #1-4.

A detailed description thereof will hereinafter be given below.

It is assumed that another coexistence system (e.g., WiGig) performs LBT (e.g., CAT-4 LBT) only in units of 2.16 GHz and transmits and receives signals. In this case, even if data transmission by the NR system is performed only in some bands within 2.16 GHz, if the energy level measured in the LBT process is greater than the ED threshold, LBT failure may occur, resulting in a transmission delay. Accordingly, if NR carriers having a CC BW smaller than an LBT BW of the other coexistence system are configured in the LBT BW or channel of the other coexistence system (e.g., WiGig), or if only the NR carriers are present in the FR4 band without intervention of the other coexistence system (e.g., WiGig), the operation in which LBT is always performed in units of 2.16 GHz and signal transmission/reception is always performed in units of 2.16 GHz may be considered inefficient in terms of channel access opportunities.

Therefore, LBT (e.g., CAT-3 LBT or CAT-4 LBT) is classified into two steps (2-step), a wideband LBT (e.g., CAT-3 LBT or CAT-4 LBT) for the wideband that is equal to or larger than the LBT BW of the other coexistence system (e.g., WiGig) is performed, and the wideband LBT fails. Thereafter, if the wideband LBT and/or the narrowband LBT (e.g., CAT-3 LBT or CAT-4 LBT) in which LBT is performed in a smaller band than the LBT BW of the other coexistence system (e.g., WiGig), the number of channel access opportunities and frequency efficiency can be increased.

However, the regulations and coexistence between the NR system and the other coexistence system (e.g., WiGig) should be considered in the above LBT process. Thus, in order to perform narrowband LBT (e.g., CAT-4 LBT) within a smaller band than the LBT BW of the other coexistence system (e.g., WiGig), the maximum output power and the ED threshold for the narrowband LBT and/or the maximum output power and the ED threshold for the wideband LBT should be configured/instructed differently from the maximum output power and the ED threshold of the coexistence system (e.g., WiGig).

A detailed description thereof will be given. In a first step ($1^{st}$ step), either the LBT BW of the other coexistence system (e.g., WiGig) or the NR carrier in a channel may perform the wideband LBT (e.g., CAT-3 LBT or CAT-4 LBT) based on the same size as the LBT BW of the other coexistence system (e.g., WiGig) and the ED threshold. This operation may be equal to the operation for performing LBT based on the reference LBT parameter set of Embodiment #1-2 of Proposed Method #1 that is performed based on the same LBT BW as the other coexistence system (e.g., WiGig), the maximum output power, and the ED threshold value.

If the $1^{st}$ step wideband LBT (e.g., CAT-4 LBT) succeeds, the NR carrier may transmit DL/UL signals based on the same maximum output power as the other coexistence system (e.g., WiGig). However, if the wideband LBT fails, the narrowband LBT (e.g., CAT-4 LBT) is performed again in the $2^{nd}$ step. Thereafter, if the LBT is successful because the corresponding narrowband is idle. DL/UL, signals can be transmitted through the corresponding narrowband band.

The failure of wideband CAT-4 LBT of the $1^{st}$ step may occur because data is being transmitted through the entire band of the LBT BW (e.g., 2.16 GHz) of the other coexistence system (e.g., WiGig). Alternatively, failure of wideband CAT-4 LBT of the $1^{st}$ step may occur due to data transmission generated in a specific narrowband included in the wideband.

Therefore, the 2nd narrowband LBT (e.g., CAT-4 LBT) is performed by selecting one of a plurality of narrowbands configured in the wideband where the wideband CAT-4 LBT was performed. Then, if LBT is successful, DL/UL signals can be transmitted within the corresponding band. At this time, among the plurality of narrowbands included in the wideband, a narrowband to be used for LBT, the ED threshold to be used for the narrowband LBT, and/or the maximum output power to be used for data transmission may be promised in advance, or may be semi-statically (e.g., RRC signal) or dynamically (e.g., DCI) configured/instructed by the base station (BS). At this time, the narrowband LBT has many more LBT opportunities than the other coexistence system (e.g., WiGig), allows LBT to be performed based on a smaller LBT BW than the LBT BW of the other coexistence system (e.g., WiGig). As a result, from the viewpoint of fair coexistence, a lower ED threshold than the ED threshold of the other coexistence system (e.g., WiGig) may be used, or DL/UL transmission may be performed based on a smaller maximum output power.

For example, when the 2.16 GHz wideband includes two 1.08 GHz narrowbands, the wideband LBT (for example, CAT-4 LBT) may be performed based on the same ED threshold as the other coexistence system (e.g., WiGig) in which 2.16 GHz is used in units of LBT BW. Thereafter, if the wideband LBT succeeds, DL/UL signals can be transmitted based on the same maximum output power as the other coexistence system (e.g., WiGig) through the corresponding band.

When wideband LBT fails, the LBT parameter set may be configured in consideration of the NR CC BW according to Embodiment #1-3 or #1-4 of Proposed Method #1 for one narrow band that is designated according to a preset/instructed rule and/or a configuration/instruction of the BS from among two 1.08 GHz, narrowbands, and stay perform the narrowband LBT (e.g., CAT-3 LBT or CAT-4 LBT). At this time, since the CC BW of NR is half the size of Z indicating the reference BW of the other coexistence system (e.g., WiGig), the narrowband LBT may be performed based on the ED threshold that is 3 dB lower than the ED threshold of the other coexistence system (e.g., WiGig), and/or DL/UL signals may be transmitted using the maximum output power that is 3 dB lower than the maximum output power of the other coexistence system (e.g., WiGig).

[Proposed Method #3]

In Proposed Method #3, according to whether the CP (cyclic prefix) type is a normal CP (NCP) or an extended CP (ECP) or according to whether the CP type includes the SCP, a method for configuring/instructing differently the number of symbols (C1 value) required when CPE (cyclic prefix extension) for UL signal/channel transmission in an unlicensed band will hereinafter be described in detail.

Uplink data transmission such as PUSCH may be instructed through DCI (e.g., UI, grant) included in PDCCH. The corresponding DCI may include information about the type of the LBT to be used for the UE performing the channel access procedure and information about the PUSCH starting position.

Specifically, according to the legacy LIE eLAA standard, it is instructed whether the LBT type to be used for the channel access procedure through a field composed of one bit (1 bit) included in the UL grant DCI is Type 1 (Cat-4 LBT) or Type 2 (25 μs CAT-2 LBT), and it may be possible to instruct any one selected from among four PUSCH starting positions {symbol #0, symbol #0+25 μs, symbol #0+25 μs+TA(timing advance symbol #1} through a field composed of two other bits (2-bits).

On the other hand, in the NR system, the BS may inform the UE of time-domain resources of PUSCH through the SLIV (start and length indicator value) contained in the UL grant, i.e., the BS may instruct the starting symbol position and the number of symbols constructing the PUSCH. That is, not all symbols constituting the slot are used for PUSCH transmission, and PUSCHs as long as the number of symbols from the start symbol instructed by the SLIV can be transmitted. Therefore, whereas the PUSCH starting position is present between Symbol #0 and Symbol #1 according to the existing system, the NR system may be constructed in a manner that the PUSCH starting position is present between #K and #K-N according to a gap between the SCS and the starting symbol #K instructed by the SLIV.

In the unlicensed band, when the BS instructs the UE to transmit a UL signal/channel (e.g., PUSCH, PUCCH, SRS, etc.), the BS may instruct the transmission start position considering the LBT gap through the UL grant, and may perform the instructed LBT. In addition, when the time at which the LBT was successful is located before the transmission start position instructed through the UL grant, in order to prevent other devices or other coexistence systems from occupying the channel, data to be transmitted may be filled with a cyclic prefix extension (CPE) having a length not exceeding a maximum of one OFDM symbol based on the corresponding SCS, so that the resultant data can be transmitted.

When the CPE is instructed in consideration of the type of LBT to be performed by the UE, a gap length, and a TA (timing advance), a specific constant (Cx) may be configured/instructed in advance for each subcarrier spacing (SCS), and the UE may calculate the length of CPEs to be filled by the corresponding UE based on the corresponding Cx. For reference, the length of the supported CPE, which can be located before PUSCH transmission in NR-U, is shown in Table 11 below.

TABLE 11

Agreement:
For the CP extension prior to at least a dynamically scheduled PUSCH transmission, the CP extension is located in the symbol(s) immediately preceding the PUSCH allocation indicated by SLIV. The supported durations for CP extension at the UE are:
0 (i.e. no CP extension)
C1*symbol length - 25 μs
C2*symbol length - 16 μs - TA
C3*symbol length - 25 μs - TA
C1=1 for 15 and 30 kHz SCS, C1=2 for 60 kHz SCS
FFS: Whether C2/C3 is fixed or implicitly derived based on TA for each subcarrier spacing
The N2 timeline (UL grant to PUSCH delay) needs to be relaxed to take the CP extension into account
FFS: Whether the limit as per the previous agreement bounding the resulting CP extension to be less than or equal to one symbol for the given subcarrier spacing should be relaxed
FFS: Applicability of this to other UL transmissions
FFS: Whether the number of durations for CP extension that the UE can be signalled dynamically can be configured On the other hand, in a high-frequency unlicensed band of 52 GHz or higher, the length of the gap required for each LBT type may be different, but the CPE length required for UL signal/channel transmission may be calculated using the same principle as described above.

In addition, in the high-frequency band, a much larger SCS than the NR-U having the 7 GHz band or less can be supported due to phase noise and the like.

According to the NR frame structure, the CP length may increase by 16*Ts every 0.5 msec. For example, in one slot consisting of 14 symbols, the CP length of each of the first symbol (i.e., Symbol #0) and the CP length of the eighth symbol (i.e., Symbol #7) may be longer than the CP length of another symbol by the length of 16*Ts.

As the SCS increases and the symbol length decreases, the length of 16*Ts becomes relatively longer. The corresponding CP length may be equal to about half of one OFDM symbol duration in the SCS of 960 kHz, and may be equal to about half of one OFDM symbol duration in the SCS of 1920 kHz. When the CP of the symbol returning at intervals of 0.5 msec is referred to as a super large CP, the symbol length varies according to NCP (normal CP), ECP (extended CP), and SCP (super large CP), and thus the "Cx" value required when the CPE is instructed may be different.

Table 12 shows an example of calculating the number of symbols required for the symbol length and the C1 value according to the SCS and the CP type when a gap length (G1) for CAT-2 LBT is set to 8 ms (G1=8 ms).

TABLE 12

| SCS [kHz] | 60 | 120 | 240 | 480 | 960 | 1920 |
|---|---|---|---|---|---|---|
| | | | NCP | | | |
| Symbol duration | 16.7 μs | 8.33 μs | 4.17 μs | 2.08 μs | 1.04 μs | 520 ns |
| CP length | 1.17 μs | 586 ns | 293 ns | 146 ns | 73 ns | 36.5 ns |
| Total | 17.87 μs | 8.92 μs | 4.46 μs | 2.23 μs | 1.11 μs | 557 ns |
| C1 value for Cat-2 (8 μs) | 1 | 1 | 2 | 4 | 8 | 15 |
| | | | SCP | | | |
| Symbol index 0 or 7*2$^u$ | 18.39 μs | 9.44 μs | 4.98 μs | 2.75 μs | 1.63 μs | 1.078 μs |
| C1 value for Cat-2 (8 μs) | 1 | 1 | 2 | 4 | Nominal CP symbol 6 + super CP symbol 1 | Nominal CP symbol 13 + super CP symbol 1 |
| | | | ECP | | | |
| Symbol duration | 16.7 μs | 8.33 μs | 4.17 μs | 2.08 μs | 1.04 μs | 520 ns |
| CP length | 4.17 μs | 2.085 μs | 1.043 μs | 521 ns | 260 ns | 130 ns |
| Total | 20.87 μs | 10.42 μs | 5.21 μs | 2.6 μs | 1.3 μs | 650 ns |
| C1 value for Cat-2 (8 μs) | 1 | 1 | 2 | 4 | 7 | 3 |
| | | | SCP | | | |
| Symbol index 0 or 7*2$^u$ | 21.39 μs | 10.94 μs | 5.73 μs | 3.12 μs | 1.82 μs | 1.171 μs |
| C1 value for Cat-2 (8 μs) | 1 | 1 | 2 | Nominal CP symbol 2 + Super CP symbol 1 | Nominal CP symbol 5 + Super CP symbol 1 | Nominal CP symbol 11 + Super CP symbol 1 |

An LBT gap of G1 µs is required to perform CAT-2 in a band of 52.6 GHz or higher. Table 12 shows the symbol durations and the CP lengths for each SCS in NCP/ECP, and shows the required C1 values for each CP on the assumption of G1=8 µs on the basis of the result of calculating the length of 1 OFDM symbol obtained by the sum of the symbol duration and the CP length.

In addition, Table 12 also includes the result of calculating the C1 value required for CAT-2 LBT by calculating the length of 1 OFDM symbol of SCP that arrives at intervals of 0.5 ms for each NCP/ECP.

Referring to Table 12, at 60-480 kHz, the C1 value of NCP or ECP does not change from the existing C1 value. In addition, whereas NCP at 960 kHz SCS requires 8 symbols and NCP at 1920 kHz SCS requires 15 symbols, ECP at 960 kHz SCS can create a CAT-2 LBT gap of 8 µs using 7 symbols and ECP at 1920 kHz SCS can create a CAT-2 LBT gap of 8 µs using 13 symbols. In addition, the symbol length for SCP becomes longer by 16*Ts. Thus, if G1 is set to 8 µs (G1=8 us), the number of symbols for the CAT-2 LBT gap may be different depending on whether the SCP is included or not.

Based on the above description, a method for configuring/instructing the C1 value according to Proposed Method #3 will be described in detail.

When the subcarrier spacing (SCS) value of the UE is equal to or greater than a specific value X, the C1 value obtained when the super CP symbol is included may be configured (or applied) to be less than the C1 value obtained when the super CP symbol is not included. For example, the C1 value obtained when the super CP symbol is included may be configured (or applied) to be less than the C1 value obtained when the super CP symbol is not included by one OFDM symbol.

For example, if X is determined to be 960 kHz regardless of the CP length setting, or if X is set to NCP according to the CP length setting, X may be determined to be 960 kHz (i.e., X=960 kHz). Also, if X is set to ECP, X may be set to 480 KHz (i.e., X=480 kHz).

In addition, the above-described embodiment may be applied to the C2 and C3 values required for CPE calculation based on a gap length required for CAT-1 LBT or CAT-2 LBT and the TA value of the UE in DL-to-UL transmission scheduling. That is, Embodiment #3-1 may also be applied to the process of determining the C2 and C3 values required for calculating (C2*symbol length−G2−TA) and (C3*symbol length−G1−TA). For example, the C2 and C3 values in the case where the SCP is included may be configured (or applied) to be less than the C2 and C3 values in the case where the SCP symbol is not included. For example, the C2 and C3 values in the case where the SCP is included may be set to a value that is smaller by 1 OFDM symbol than each of the C2 and C3 values for use in the case where the SCP symbol is not included.

If the CP type is ECP, the C1 value may be configured (or applied) to be 1 symbol smaller than the C1 value of the NCP at the SCS of 960 kHz. In addition, when the CP type is ECP, the C1 value may be configured (or applied) to be 2 symbols smaller than the C1 value of the NCP at SCS of 1920 kHz.

However, the G1 and G2 values may lave different values according to the regulations for each region (country).

More specifically, the C1 value required for CPE may vary depending on whether the CP type is NCP or ECP or depending on whether the SCP is included or not. For example, assuming that the LBT gap (G1) required for CAT-2 LBT is set to 8 µs (G1=8 µs), the C1 value required for each NCP/ECP can be calculated as follows.)

1) In case of NCP+960 kHz, 8 symbols are required for the gap G1 of 8 µs (G1=8 µs) in consideration of only NCP symbols. In contrast, if the SCP is included, the gap G1 of 8 µs (G1=8 µs) can be created using six NCP symbols and one super CP symbol.
2) In case of NCP+1920 kHz, 15 symbols are required for the gap G1 of 8 µs (G1=8 µs) in consideration of only NCP symbols. In contrast, if the SCP is included, the gap G1 of 8 µs (G1=8 µs) can also be created using 13 NCP symbols and one super SCP symbol.
3) In case of ECP+960 kHz, 7 symbols are required for the gap G1 of 8 µs (G1=8 µs) in consideration of only NCP symbols. In contrast, if the SCP is included, the gap G1 of 8 µs (G1=8 µs) can also be created using 5 NCP symbols and one SCP symbol.
4) In case of ECP+1920 kHz, 13 symbols are required for the gap G1 of 8 µs (G1=8 µs) in consideration of only NCP symbols. In contrast, if the SCP is included, the gap G1 of 8 µs (G1=8 µs) can also be created using 11 NCP symbols and one SCP symbol.
5) In case of ECP+480K Hz, 4 symbols are required in consideration of only NCP symbols. In contrast, if the SCP is included, the gap G1 of 8 µs (G1=8p) can also be created using two NCP symbols and one SCP symbol.

In addition, when making the gap (G1) of 8 µs (G1=8 µs) depending on whether the CP type is NCP or ECP regardless of whether or not the SCP is included, the C1 value obtained when the CP type is ECP may be configured (or applied) to be 1-symbol less than the C1 value obtained when the CP type is NCP at 960 kHz SCS, or may be configured (or applied) to be 2-symbols less than the C1 value obtained when the CP type is NCP at 1.920 kHz SCS.

Here, the gap length (G1) required for CAT-2 LBT and the gap length (G2) required for CAT-1 LBT may vary according to the regulations defined in the corresponding country/region.

Meanwhile, the embodiments described in the above-mentioned Proposed Method #1 to Proposed Method #3 may be performed independently of each other, or may also be implemented in the form of a combination thereof. For example, the plurality of embodiments described in one proposed method may be implemented in the form of a combination thereof, or the plurality of embodiments described in the plural proposed methods may also be implemented in the form of a combination thereof.

Meanwhile, the content of the present disclosure may not be limited to transmission and reception of uplink and/or downlink signals. For example, the content of the present disclosure may also be applied to UE-to-UE direct communication. In addition, the term "base station" according to the present disclosure may conceptually include not only a base station (BS) but also a relay node. For example, the BS operation according to the present disclosure may be performed by the BS, but may also be performed by the relay node.

Since examples of the above-described various proposals may also be included as implementation methods of the present disclosure, it is obvious that they may be regarded as a kind of proposed methods. The present disclosure is not limited to direct communication between UEs, and may also be used in uplink or downlink communication, and at this time, a base station or a relay node can use the proposed method. Rules can be defined in a manner that information about whether the above-described proposed methods are applied (or information about the rules of the proposed methods) can be signaled from the BS to the UE or from the Tx UE to the Rx UE through pre-defined signaling (e.g., physical layer signaling or higher layer signaling).

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 15:
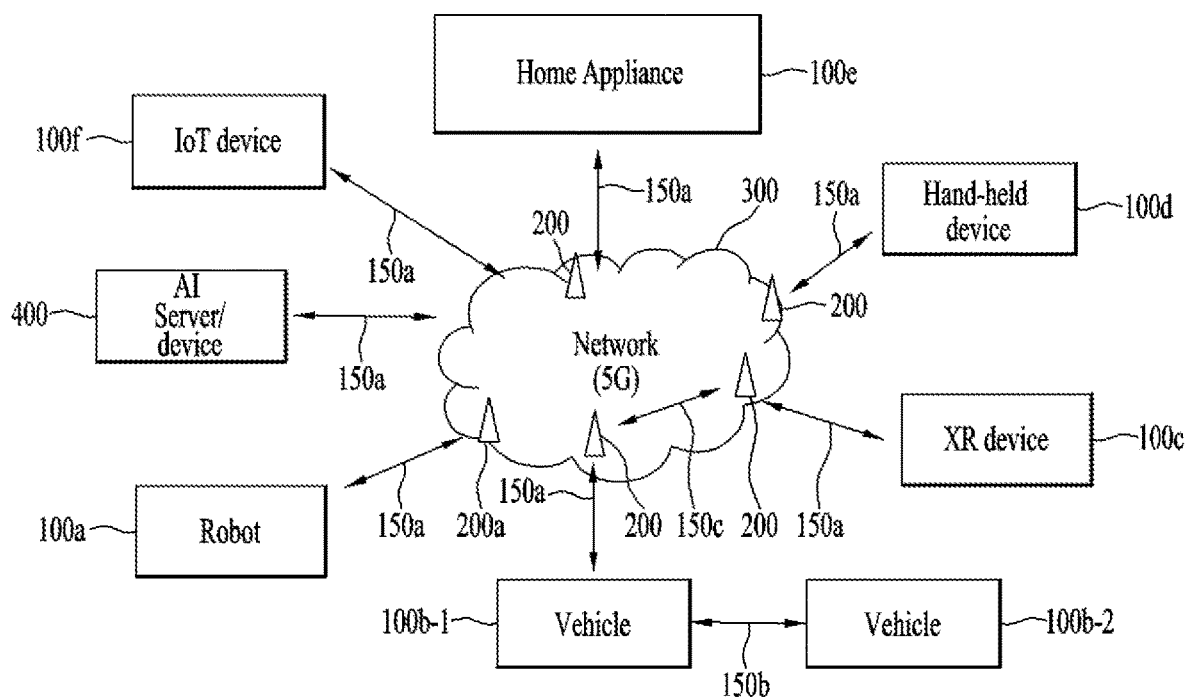
FIG. 15 illustrates an exemplary communication system applied to the present disclosure.

FIG. 15 illustrates a communication system 1 applied to the present disclosure.

Referring to FIG. 15, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 16:
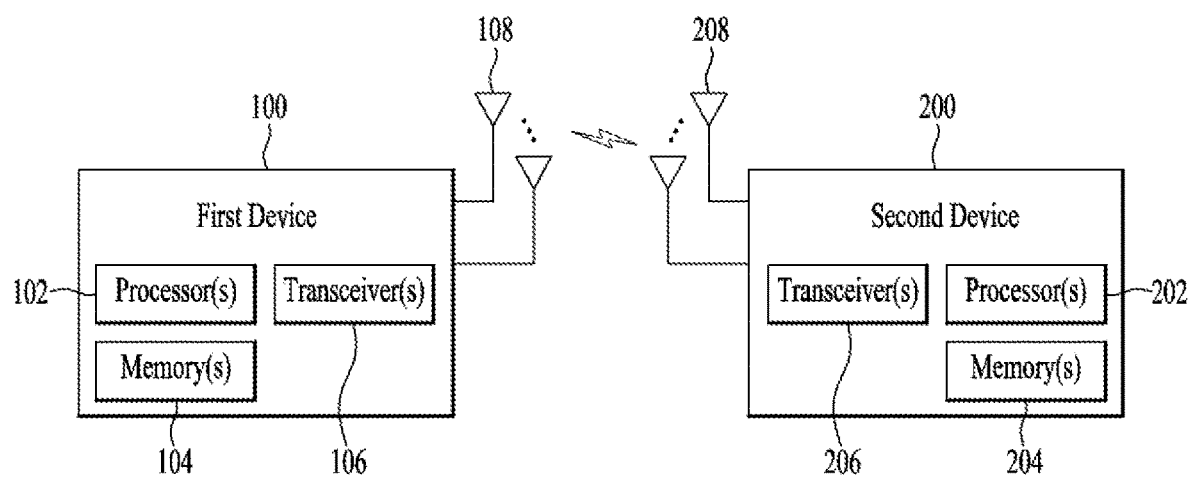
FIG. 16 illustrates an exemplary wireless device applicable to the present disclosure.

FIG. 16 illustrates wireless devices applicable to the present disclosure.

Referring to FIG. 16, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will be described.

Although the following operations will be described based on a control operation of the processor 102 in terms of the processor 102, software code for performing such an operation may be stored in the memory 104. For example, in the present disclosure, the at least one memory 104 may be a non-transitory computer-readable storage medium and may store instructions or programs. The instructions or programs may cause, when executed, the at least one processor operably connected to the at least one memory to perform operations according to embodiments or implementations of the present disclosure, related to the following operations.

Specifically, for uplink transmission and reception, the processor 102 may control the transceiver 106 to receive information for configuring the unit LBT BW from the base station (BS), in this case, the information for configuring the unit LBT BW may be controlled to be received through an RRC (Radio Resource Configuration) signal, or may be controlled to be received through DCI (Downlink Control Information). In addition, the above steps may be omitted, and the unit LBT BW may be preset in the processor 102.

The processor 102 may obtain the maximum output power and the ED threshold. In this case, the maximum output power and the ED threshold may be configured based on the configured unit LBT BW. An example of a method for configuring the unit LBT BW, the maximum output power, and the ED threshold, an example of the maximum output power, and an example of the ED threshold may be implemented based on the above-described Proposed Method #1 and Proposed Method #2.

The processor 102 may control the transceiver 106 to perform LBT based on the ED threshold configured in units of the configured unit LBT BW, and may control the transceiver 106 to transmit uplink signals to the BS based on the configured maximum output power according to the LBT result. In this case, a detailed method for transmitting uplink signals may be implemented based on Proposed Method #1 to Proposed Method #3.

On the other hand, for downlink transmission and reception, the processor 102 may control the transceiver 106 to receive downlink signals from the base station (BS) in a situation where the BS performs LBT according to Proposed Method #1 to Proposed Method #3 based on the unit LBT BW, the maximum output power, and the ED threshold that are configured according to Proposed Method #1 and Proposed Method #2.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 100 and stored in the memory 204 of the second wireless device 200, according to an embodiment of the present disclosure will be described.

Although the following operations will be described based on a control operation of the processor 202 in terms of the processor 202, software code for performing such an operation may be stored in the memory 204. For example, in the present disclosure, the at least one memory 204 may be a computer-readable storage medium and may store instructions or programs. The instructions or programs may cause, when executed, the at least one processor operably connected to the at least one memory to perform operations according to embodiments or implementations of the present disclosure, related to the following operations.

Specifically, for downlink transmission and reception, the processor 202 may configure the unit LBT BW, and may obtain the maximum output power and the ED threshold for the downlink signal. At this time, the maximum output power and the ED threshold may be obtained based on the unit LBT BW. An example of a method for configuring the unit LBT BW, the maximum output power, and the ED threshold, an example of the maximum output power, and an example of the ED threshold may be implemented based on the above-described Proposed Method #1 and Proposed Method #2.

The processor 202 may control the transceiver 206 to perform LBT based on the ED threshold configured in units of the configured unit LBT BW, and may control the transceiver 206 to transmit uplink signals to the UE based on the configured maximum output power according to the LBT result. In this case, a detailed method for transmitting downlink signals may be implemented based on Proposed. Method. #1 to Proposed Method. #3.

In addition, for uplink transmission and reception, the processor 202 may control the transceiver 206 to transmit information for configuring the unit LBT BW to the UE. In this case, information for configuring the unit LBT BW may be transmitted through a radio resource configuration (RRC) signal, or may be transmitted through DCI (Downlink Control Information). However, the above-described steps may be omitted, and the unit LBT BW may be preset in the UE.

The processor 202 may control the transceiver 206 such that the UE performs LBT based on the ED threshold in units of unit LBT BW and receives the uplink signal. In this case, the method for transmitting the uplink signal may be implemented based on Proposed Method #1 to Proposed Method #3.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 17:
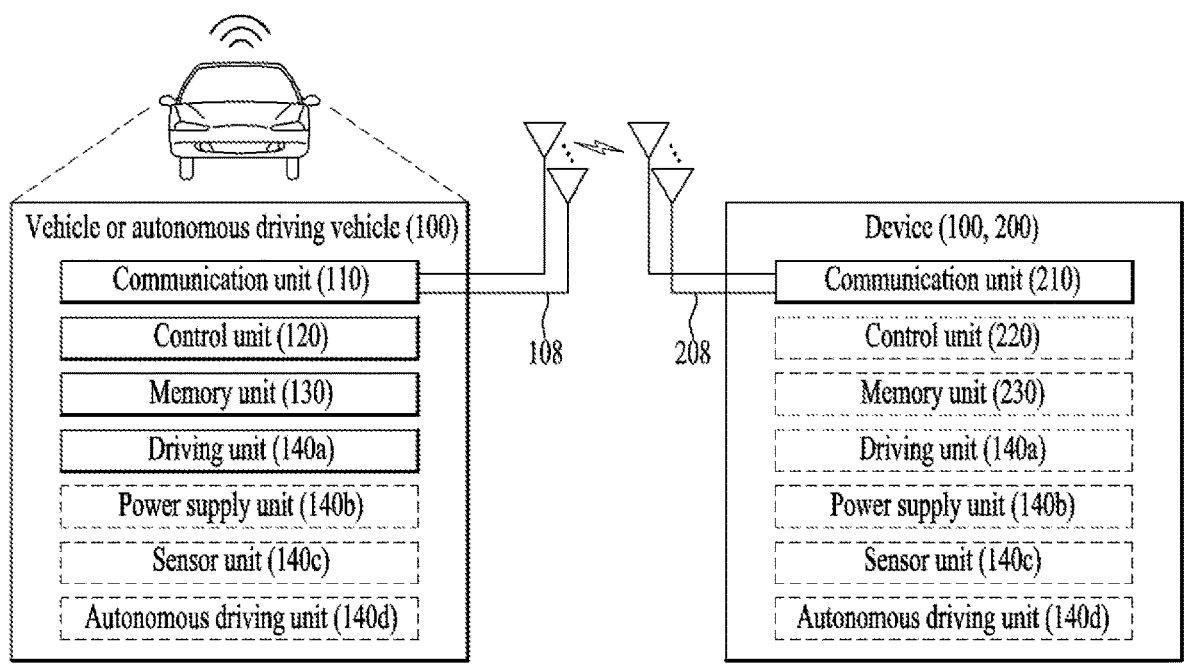
FIG. 17 illustrates an exemplary vehicle or autonomous driving vehicle applicable to the present disclosure.

FIG. 17 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 17, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method of performing a CAP and the apparatus therefor have been described based on an example applied to a 5G NR system, the method and apparatus are applicable to various wireless communication systems in addition to the 5G NR system.

What is claimed is:

1. A method performed by a device, the method comprising:
   performing a channel access procedure (CAP); and
   transmitting a signal based on a result of the CAP,
   wherein the CAP is performed based on 2-step CAP comprising a first CAP based on a first random number counter and a second CAP based on a second random number counter, the second CAP selectively performed based on a failure of the first CAP, and
   wherein the first CAP is performed for a frequency band in units of a first frequency size, and the second CAP is performed for the frequency band in units of a second frequency size smaller than the first frequency size, and the second frequency size is configured based on a signaling from an other device.

2. The method according to claim 1,
   wherein the signaling from the other device is semi-static signaling or dynamic signaling.

3. The method according to claim 1, wherein:
   a maximum output power value is determined based on a BW size for transmitting the signal; and
   an energy detection (ED) threshold for the second CAP is determined based on the maximum output power value.

4. The method according to claim 1, wherein:
   an energy detection (ED) threshold for the second CAP is determined based on a BW size for transmitting the signal.

5. The method according to claim 1,
   wherein an energy detection (ED) threshold for the second CAP is a fixed value.

6. The method according to claim 1, wherein:
   an energy detection (ED) threshold for the first CAP is different from an ED threshold for the second CAP.

7. The method according to claim 1, wherein:
   a number of orthogonal frequency division multiplexing (OFDM) symbols for a cyclic prefix extension (CPE) used for at least one of the first CAP or the second CAP is determined based on a subcarrier spacing (SCS) and whether a super cyclic prefix (SCP) is included in a duration for the CPE.

8. A device comprising:
   at least one processor; and
   at least one memory operatively connected to the at least one processor and configured to store instructions that when executed causes the at least one processor to perform operations, the operations comprising:
   performing a channel access procedure (CAP); and
   transmitting a signal based on a result of the CAP,
   wherein the CAP is performed based on 2-step CAP comprising a first CAP based on a first random number counter and a second CAP based on a second random number counter, the second CAP selectively performed based on a failure of the first CAP, and
   wherein the first CAP is performed for a frequency band in units of a first frequency size, and the second CAP is performed for the frequency band in units of a second frequency size smaller than the first frequency size, and the second frequency size is configured based on a signaling from an other device.

9. The device according to claim 8,
   wherein the signaling from the other device is semi-static signaling or dynamic signaling.

10. The device according to claim 8, wherein:

a maximum output power value is determined based on a BW size for transmitting the signal; and an energy detection (ED) threshold for the second CAP is determined based on the maximum output power value.

11. The device according to claim 8, wherein:

an energy detection (ED) threshold for the second CAP is determined based on a BW size for transmitting the signal.

12. The device according to claim 8, wherein an energy detection (ED) threshold for the second CAP is a fixed value.

13. The device according to claim 8, wherein:

an energy detection (ED) threshold for the first CAP is different from an ED threshold for the second CAP.

14. The device according to claim 8, wherein:

a number of orthogonal frequency division multiplexing (OFDM) symbols for a cyclic prefix extension (CPE) used for at least one of the first CAP or the second CAP is determined based on a subcarrier spacing (SCS) and whether a super cyclic prefix (SCP) is included in a duration for the CPE.

15. A non-transitory computer-readable storage medium including at least one computer program for causing at least one processor to perform operations, the operations comprising:

performing a channel access procedure (CAP); and transmitting a signal based on a result of the CAP, wherein the CAP is performed based on 2-step CAP comprising performing a first CAP based on a first random number counter and a second CAP based on a second random number counter, the second CAP selectively performed based on a failure of the first CAP, and wherein the first CAP is performed for a frequency band in units of a first frequency size, and the second CAP is performed for the frequency band in units of a second frequency size smaller than the first frequency size, and the second frequency size is configured based on a signaling from an other device.

* * * * *